United States Patent [19]

Sato

[11] Patent Number: 5,526,138
[45] Date of Patent: Jun. 11, 1996

[54] STILL VIDEO DEVICE IN WHICH IMAGE SIGNALS CORRESPONDING TO ONE FRAME CAN BE DIVIDED AND RECORDED ON A PLURALITY OF TRACKS

[75] Inventor: Koichi Sato, Tokyo, Japan

[73] Assignee: Asahi Kogaku Kabushiki Kaisha, Japan

[21] Appl. No.: 348,247

[22] Filed: Nov. 28, 1994

Related U.S. Application Data

[63] Continuation of Ser. No. 130,859, Oct. 4, 1993, abandoned.

[30] Foreign Application Priority Data

| Oct. 5, 1992 | [JP] | Japan | 4-290746 |
| Oct. 5, 1992 | [JP] | Japan | 4-290747 |
| Oct. 5, 1992 | [JP] | Japan | 4-290749 |
| Oct. 15, 1992 | [JP] | Japan | 4-290748 |

[51] Int. Cl.$^6$ .................................................. H04N 5/76
[52] U.S. Cl. .................................... 358/342; 358/335
[58] Field of Search .................................. 358/342, 335, 358/310, 311, 341, 343; 360/32, 13, 14.1, 14.2, 14.3, 35.1

[56] References Cited

U.S. PATENT DOCUMENTS

| 4,065,795 | 12/1977 | Shutterly | 360/35 |
| 5,130,861 | 7/1992 | Suma | 360/32 |
| 5,359,427 | 10/1994 | Sato . | |

FOREIGN PATENT DOCUMENTS

| 0444545 | 8/1991 | European Pat. Off. . |
| 0444513 | 9/1991 | European Pat. Off. . |
| 0444511 | 9/1991 | European Pat. Off. . |
| 0446674 | 9/1991 | European Pat. Off. . |
| 6437193 | 2/1989 | Japan . |
| 2-50358 | 2/1990 | Japan . |
| 5-30461 | 2/1993 | Japan . |

*Primary Examiner*—Tommy P. Chin
*Assistant Examiner*—Robert Chevalier
*Attorney, Agent, or Firm*—Greenblum & Bernstein

[57] ABSTRACT

A still video device in which image signals corresponding to one frame are divided into a plurality of parts and recorded on a plurality of tracks on a magnetic disk. On a track on which an image signal forming the same frame as the other track, the same lead track number is recorded in an ID code recording area of the track. In a recording operation, the ID code is decoded, so that the lead track number is stored in a memory. When a lead track number of a track which is reproduced is coincident with the lead track number stored in the memory, the image signal of the track is stored in a predetermined area of the memory in accordance with a composing frame number. By repeating such an storing operation, all of the image signals forming one frame are reproduced. Then, the image signals are read out from the memory in a predetermined order so that the reproduced image is outputted to a display device.

21 Claims, 22 Drawing Sheets

Fig. 8
| B | A | |
|---|---|---|
| 0 | 0 | NORMAL-SIGNAL/NORMAL-RECORD MODE |
| 0 | 1 | NORMAL-SIGNAL/HIGH-DEFINITION RECORD MODE |
| 1 | 0 | HIGH-DEFINITION-SIGNAL RECORD MODE |
| 1 | 1 | NORMAL-SIGNAL/SEPARATING-TRACK/FRAME-RECORD MODE |
Fig. 9
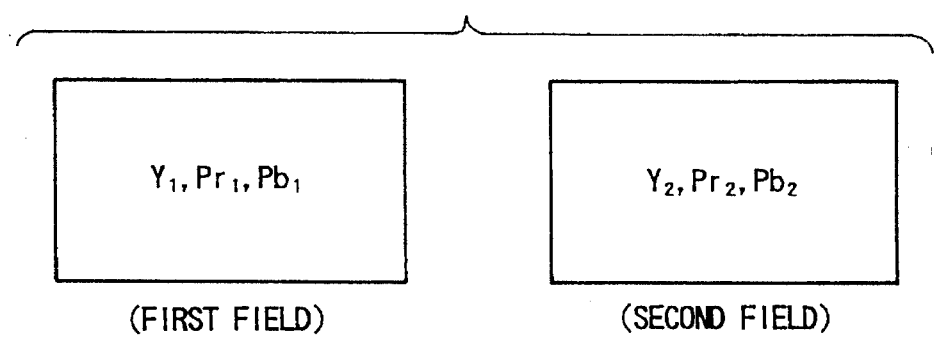
$Y_1, Pr_1, Pb_1$ (FIRST FIELD)   $Y_2, Pr_2, Pb_2$ (SECOND FIELD)
Fig. 10
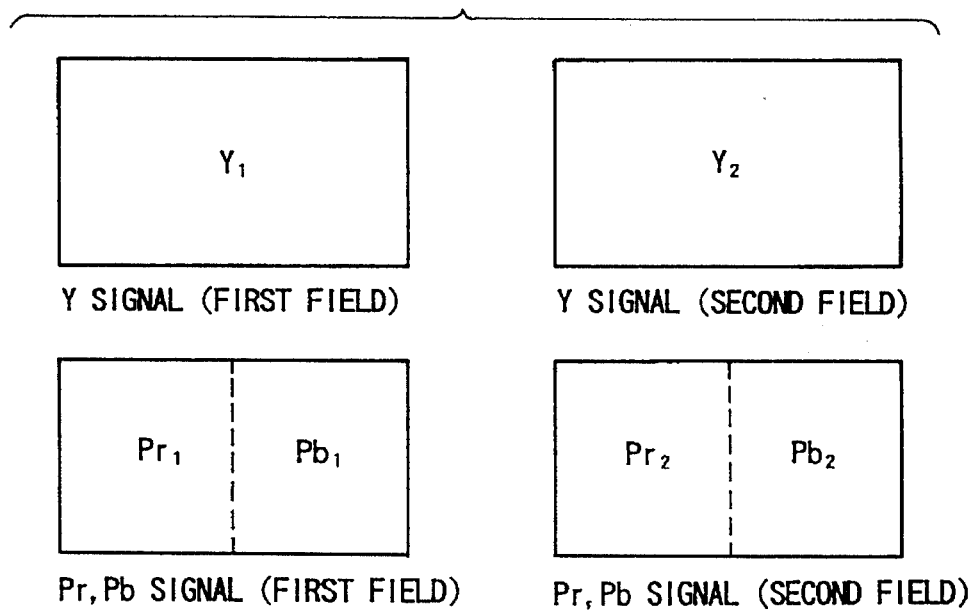
Y SIGNAL (FIRST FIELD)   Y SIGNAL (SECOND FIELD)
Pr, Pb SIGNAL (FIRST FIELD)   Pr, Pb SIGNAL (SECOND FIELD)

Fig. 11

| B | A |  |
|---|---|---|
| 0 | 0 | FIELD |
| 0 | 1 | FRAME (FIRST FIELD) |
| 1 | 0 | FRAME (SECOND FIELD) |

Fig. 12

| A |  |
|---|---|
| 0 | OUTSIDE→INSIDE |
| 1 | INSIDE→OUTSIDE |

Fig. 13

| MSB | | | | | | LSB | |
|---|---|---|---|---|---|---|---|
| G | F | E | D | C | B | A | |
| 0 | 0 | 1 | 0 | 1 | 1 | 0 | →16 |

Fig. 14

| MSB | | | | | | LSB | |
|---|---|---|---|---|---|---|---|
| G | F | E | D | C | B | A | |
| 0 | 1 | 1 | 0 | 0 | 1 | 0 | →32 |

Fig. 15

| MSB | | LSB | | |
|---|---|---|---|---|
| D | C | B | A | |
| 0 | 0 | 0 | 1 | →01 |
| 1 | 1 | 1 | 1 | →15 |
| 0 | 0 | 0 | 0 | →16 |

5,526,138

STILL VIDEO DEVICE IN WHICH IMAGE SIGNALS CORRESPONDING TO ONE FRAME CAN BE DIVIDED AND RECORDED ON A PLURALITY OF TRACKS

This application is a continuation, of application Ser. No. 08/130,859, filed Oct. 4, 1993, now abandoned.

BACKGROUND OF THE INVENTION

1. Field of the Invention

The present invention relates to a still video device by which an image signal corresponding to one frame is divided into a plurality of parts to be recorded on a plurality of tracks of a recording medium such as a magnetic disk.

2. Description of the Related Art

In a conventional video device, an image signal inputted thereto is frequency-modulated and recorded on a magnetic disk, and a frequency band of the signal recorded in the magnetic disk is regulated (or made constant). Nevertheless, the bandwidth of the signal is limited, due to the construction of the disk device, and thus cannot be freely expanded.

Accordingly, in a conventional still video device, when an image signal having high quality or broad bandwidth is inputted to the still video device, a limit is imposed on the resolution of the image, and thus the quality of the image is limited.

The inventor proposed, in U.S. patent application Ser. No. 07/913,191, a still video device in which an image signal corresponding to one frame is divided into a plurality of parts and stored in a memory, and the divided parts of the image signal are time-expanded and recorded on a plurality of tracks of a recording medium such as a magnetic disk, so that a high quality image can be obtained without changing the bandwidth of a signal recorded in the recording medium.

In this still video device, however, it is necessary that a plurality of consecutive blank tracks must exist on the magnetic disk when an image signal corresponding to one frame is divided into a plurality of parts to be recorded on a plurality of tracks of the magnetic disk. Namely, such an image signal cannot be recorded on the magnetic disk when there is no plurality of blank tracks adjacent each other.

SUMMARY OF THE INVENTION

Therefore, an object of the present invention is to provide a still video device, by which an image signal corresponding to one frame can be recorded on a plurality of recording areas even if a plurality of consecutive blank tracks do not exist, and the recording areas are reproduced so that one frame is obtained.

According to the present invention, there is provided a still image recording device comprising a recording medium, a dividing means, a selecting means and a recording means.

The recording medium has a plurality of recording areas in which an image signal recording part and an ID code recording part are provided, respectively. An image signal is recorded in the image signal recording part, and an ID code including a date is recorded in the ID code recording part. The dividing means divides the image signal corresponding to one frame into a plurality of parts. The selecting means selects a blank recording area in which no signal is recorded, from the recording areas. The recording means records the divided parts of the image signal in the image signal recording part of the blank recording area, respectively. The recording means records frame-identifying-information in the ID code recording part of the recording area in which the image signal is recorded by the recording means. The divided parts of the image signal corresponding to the one frame, recorded by the recording means, is identified by the frame-identifying-information.

Further, according to the present invention, there is provided a still video device in which a recording medium is mounted, the device comprising dividing means, divided-parts recording means, frame-identifying-information recording means, divided-parts information recording means and reproducing means.

The recording medium has a plurality of recording areas in which an image signal recording part and an ID code recording part are provided. An image signal is recorded in the image signal recording part. An ID code including a date is recorded in the ID code recording part. The dividing means divides an image signal corresponding to one frame into plurality of parts. The divided parts recording means records the divided parts of image signal in the recording areas. The frame-identifying-information recording means records frame-identifying-information in the ID code recording part of each of the recording areas. A frame corresponding to the divided parts of image signal is identified by the frame-identifying-information. The divided-parts-information recording means records divided-parts-information in the ID code recording part. The divided-parts-information is specific to each of the divided parts, respectively. The reproducing means reproduces the image signal corresponding to one frame, in accordance with the frame-identifying-information and the divided-parts-information.

BRIEF DESCRIPTION OF THE DRAWINGS

The present invention will be better understood from the description of the preferred embodiments of the invention set forth below, together with the accompanying drawings, in which:

FIG. 8 is a diagram showing a record mode information;

FIG. 9 is a diagram showing a mode in which image signals are recorded in a normal-signal/normal-record mode;

FIG. 10 is a diagram showing a mode in which image signals are recorded in a normal-signal/high-difinition-record mode;

FIG. 11 is a diagram showing "FIELD/FRAME2" information;

FIG. 12 is a diagram showing "TRACKING DIRECTION" information;

FIG. 13 is a diagram showing "HEAD TRACK NUMBER" information;

FIG. 14 is a diagram showing "NEXT TRACK NUMBER" information;

FIG. 15 is a diagram showing "COMPOSING FRAME NUMBER" information;

DESCRIPTION OF THE PREFERRED EMBODIMENTS

Figure 1:
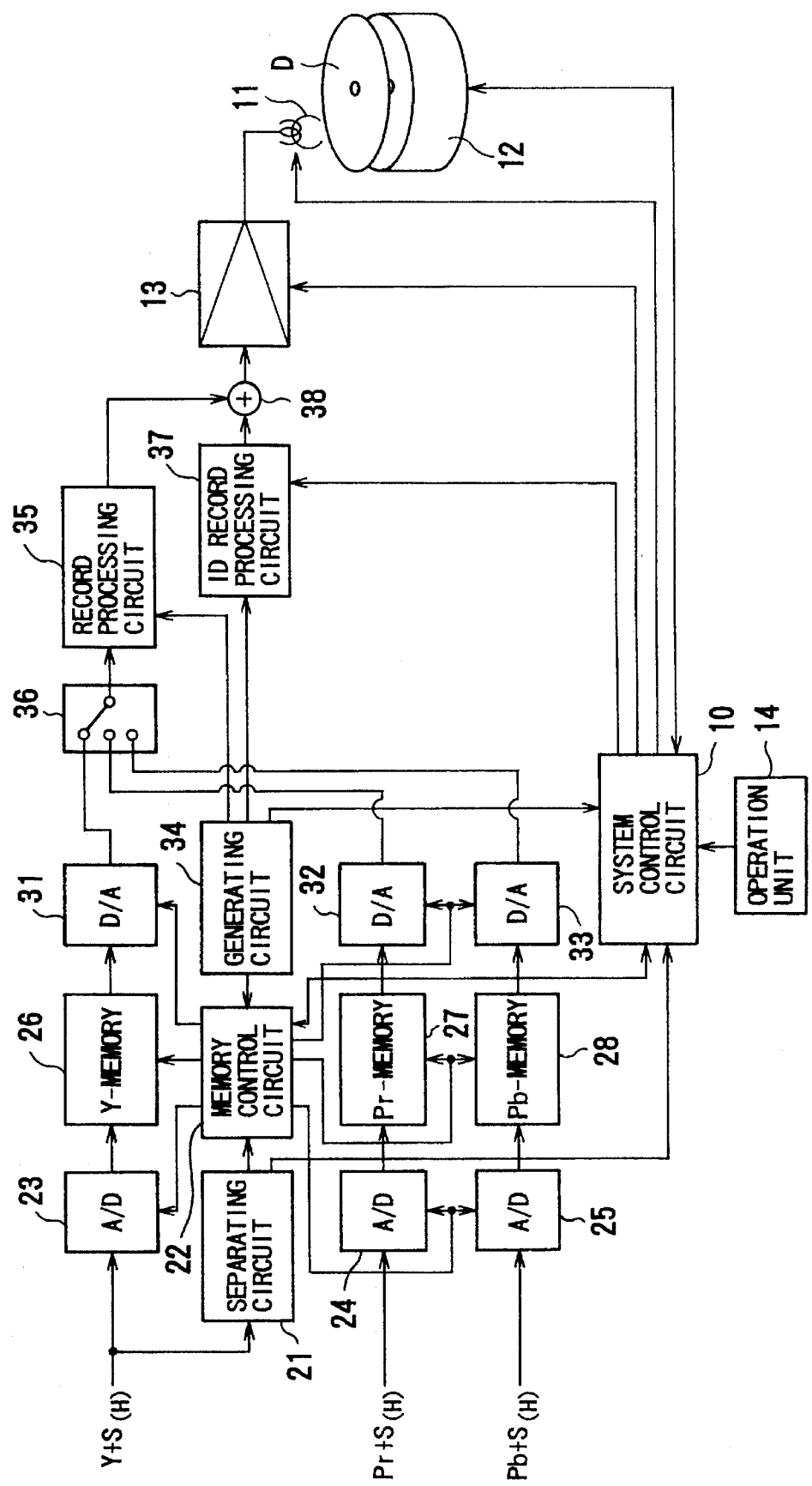
FIG. 1 is a block diagram showing a recording system for a still video device according to an embodiment of the present invention.

The present invention will now be described with reference to embodiments shown in the drawings.

FIG. 1 is a block diagram showing a recording system of a still video device according to an embodiment of the present invention.

A system control circuit 10 is a microcomputer controlling the still video device as a whole. A disk device has a magnetic head 11 and a spindle motor 12 for rotating a magnetic disk D. The magnetic head 11 is controlled by the system control circuit 10 to be displaced along a radial direction of the magnetic disk D, and thus positioned at a predetermined track on the magnetic disk D. The spindle motor 12 is controlled by the system control circuit 10 to rotate the magnetic disk D at a rotation speed of 3,600 rpm, for example. During the rotation of the magnetic disk D, the magnetic head 11 is positioned at a predetermined track on the magnetic disk D and records image signals and identification (ID) codes on this track. A recording amplifier 13 is controlled by the system control circuit 10 and outputs image signals, ID codes and other signals to the magnetic head 11. Note, the magnetic disk D has 52 tracks, and the image signals and the other signals are recorded on 50 tracks starting from the outermost track and continuing inward.

An operation unit 14 is connected to the system control circuit 10 to operate the still video device. Note, a record mode, a photographing date, and so on, which are ID codes related to an image recorded in the magnetic disk D, are inputted through the operation unit 14.

High quality images signal obtained through a still video camera (not shown) or an input terminal (not shown) are inputted to the still video device as a Y signal (a luminance signal), a Pr signal (a differential color signal "R-Y" having a standardized amplitude) and a Pb signal (a differential color signal "B-Y" having a standardized amplitude). Each of the Y signal, Pr signal and Pb signal includes a synchronizing signal S. Note, in the drawing, the reference "H" added to the inputted signals indicates that the inputted image signals have been generated in accordance with the HDTV (High Definition TV) mode. Further note, as well known, the Pr signal and the Pb signal have broader bandwidth than a conventional differential color signal, so that color resolution of the image signal is improved.

A synchronizing signal S included in the Y signal is separated from the Y signal by a synchronizing-signal-separating circuit 21, and transmitted to a memory-control circuit 22 and the system control circuit 10. The memory-control circuit 22 controls A/D converters 23, 24, 25, a Y-memory 26, a Pt-memory 27 and a Pb-memory 28, based on the synchronizing signal S. The memory-control circuit 22 also controls D/A converters 31, 32, 33, the Y-memory 26, the Pr-memory 27 and the Pb-memory 28, based on a synchronizing signal outputted from a synchronizing-signal-generating circuit 34, to be described later.

The Y signal including the synchronizing signal S is A/D converted by the A/D converter 23, and the Y signal between two synchronizing signals is stored in the Y-memory 26 by the memory control circuit 22. Similarly, the Pr signal is A/D converted by the A/D converter 24 and stored in the Pr-memory 27, and the Pb signal is A/D converted by the A/D converter 25 and stored in the Pb-memory 28.

The Y signal stored in the Y-memory 26, the Pr signal stored in the Pr-memory 27, and the Pb signal stored in the Pb-memory 28 are D/A converted by the D/A converters 31, 32 and 33, respectively, which are operated based on a synchronizing signal (a standard clock signal) outputted from the synchronizing-signal-generating circuit 34. The frequency of the standard clock signal used for D/A converting the Y signal is a one-quarter, for example, of that of a standard clock signal used for storing the Y signal in the Y-memory 26. The frequency of the standard clock signal used for D/A converting the Pr signal and the Pb signal is one-half, for example, of that of a standard clock signal used for storing the Pr signal and the Pb signal in the Pt-memory 27 and the Pb-memory 28. The frequency of the standard clock signal used for storing the Pr signal and the Pb signal in the memories 27 and 28 is one-half, for example, of that of the standard clock signal used for storing the Y signal in the memory 26. Accordingly, the Y signal, the Pr signal and the Pb signal are read out from each of the memories 26, 27 and 28 at one-quarter or one-half speed in comparison with the storing operation of the signals in the memories 26, 27 and 28, whereby the signals are time-expanded. The D/A converted Y signal, Pr signal and Pb signal are inputted through a switch 36 to a record processing circuit 35 and subjected to a process such as FM-modulation.

An ID code inputted through the operating unit 14 and the system control circuit 10 is subjected to a process such as a differential phase shift keying (DPSK) modulation, by an ID record processing circuit 37.

The DPSK-modulated ID code, the FM-modulated Y signal, Pr signal and Pb signal are superimposed by an adder 38, and then amplified by the record amplifier 13 and transmitted to the magnetic head 11. The ID code, the Y signal, the Pr signal and the Pb signal are then recorded on a predetermined track of the magnetic disk D through the magnetic head 11. The signals recorded on the magnetic disk D have been time-expanded in comparison with signals inputted to the still video device as described above. For a time-expansion recording of the image signals in the magnetic disk D, the inputted image signals are divided into a plurality of parts to be stored in the memories 26, 27 and 28.

Figure 2:
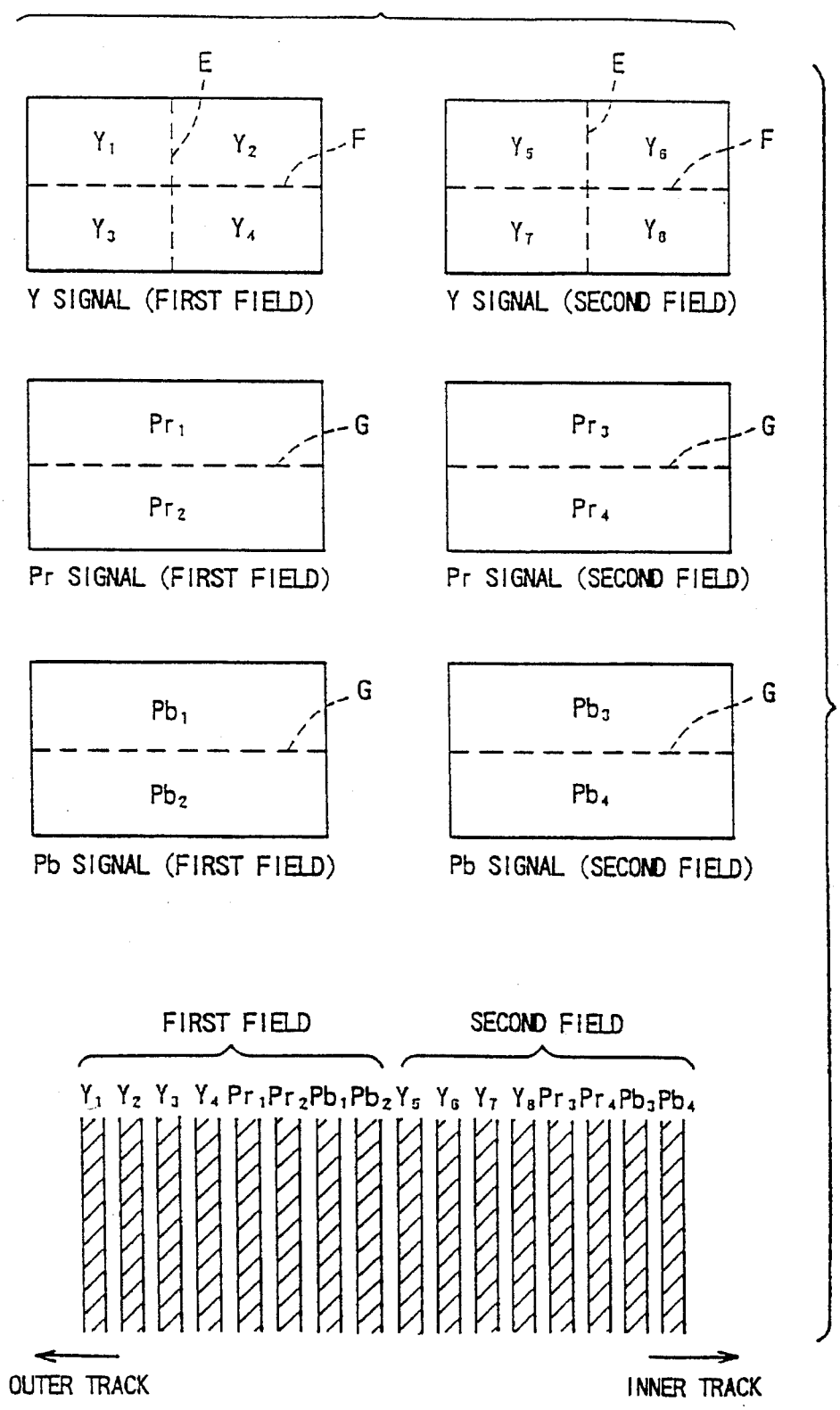
FIG. 2 is a diagram schematically showing an example of image signals in memories and on a magnetic disk in the embodiment.

FIG. 2 schematically shows an example of image signals in the memories 26, 27 and 28, and on the magnetic disk D. This example shows a case in which an image signal is stored in the memories 26, 27 and 28 and recorded on the magnetic disk D in a high definition signal record mode, which means that the image signal is recorded in a frame record mode, and the Y signal, the Pr signal and the Pb signal of one frame are divided into a plurality of parts, respectively, to be recorded on different tracks from each other. Namely, one frame is composed of a first field and a second field the Y signal of one frame is divided into four parts; the Pr signal and the Pb signal of one frame are divided into two parts, respectively; and the divided Y signal, Pr signal and Pb signal are stored in the memories 26, 27 and 28.

Regarding the Y signal, the frame is divided into four parts by a center line E extending in a vertical direction and passing through the center of the frame, and a center line F extending in a horizontal direction and passing through the center of the frame. The Y signal (Y,) corresponding to the left upper quarter of the first field is stored in a first area of the memory; the Y signal ($Y_2$) corresponding to the right upper quarter of the first field is stored in a second area of the memory; the Y signal ($Y_3$) corresponding to the left lower quarter of the first field is stored in a third area of the memory, and the Y signal ($Y_4$) corresponding to the right lower quarter of the first field is stored in a fourth area of the memory.

Regarding the Pr signal, the frame is divided into two parts by a center line G extending in a horizontal direction and passing through the center of the frame. The Pr signal ($Pr_1$) corresponding to the upper half of the first field is stored in a fifth area of the memory; and the Pr signal ($Pr_2$) corresponding to the lower half of the first field is stored in a sixth area of the memory. Regarding the Pb signal, similarly, the frame is divided into two parts by a center line G extending in a horizontal direction and passing through the center of the frame; the Pb signal ($Pb_1$) corresponding to the upper half of the first field is stored in a seventh area of the memory; and the Pb signal ($Pb_2$) corresponding to the lower half of the first field is stored in an eighth area of the memory.

Similarly, regarding a second field, the Y signals ($Y_5$, $Y_6$, $Y_7$, $Y_8$) corresponding to the left upper quarters the right upper quarters the left lower quarter and the right lower quarter are stored in a ninth areas a tenth areas an eleventh area and a twelfth area of the memory, respectively. The Pr signals ($Pr_3$, $Pr_4$) corresponding to the upper and lower halves are stored in a thirteenth area and a fourteenth area of the memory, respectively. The Pb signals ($Pb_3$, $Pb_4$) corresponding to the upper and lower halves are stored in a fifteenth area and a sixteenth area of the memory, respectively.

These signals are recorded on sixteen tracks which are consecutively arranged on the magnetic disk D. Namely, these signals are recorded consecutively on each track from an outer track to an inner tracks in order of the Y signals ($Y_1$, $Y_2$, $Y_3$, $Y_4$) of a first field, the Pr signals ($Pr_1$, $Pr_2$) of the first field, the Pb signals ($Pb_1$, $Pb_2$) of the first fields the Y signals ($Y_5$, $Y_6$, $Y_7$, $Y_8$) of a second fields the Pr signals ($Pr_2$, $Pr_4$) of the second fields and the Pb signals ($Pb_3$, $Pb_4$) of the second field.

Figure 3:
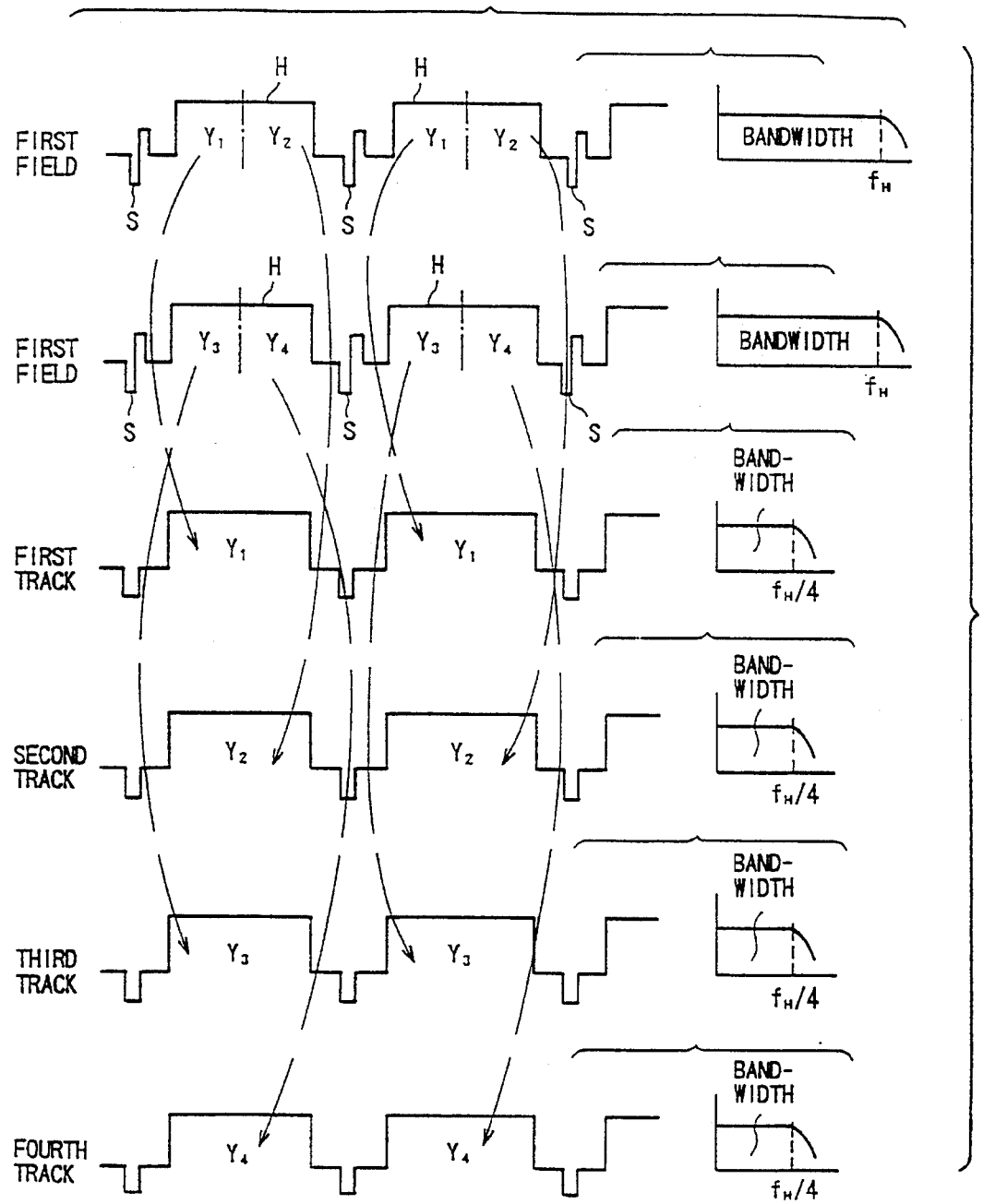
FIG. 3 is a diagram showing the relationship between a Y signal inputted to a still video device and a Y signal recorded on a magnetic disk in the embodiment.

FIG. 3 shows the relationship between a Y signal inputted to the still video device and a Y signal recorded on the magnetic disk D, when the Y signal is recorded on the magnetic disk D in the high definition signal record mode (see FIG. 2).

In the high definition signal record modes the image signal is recorded in the frame record mode. Therefore, for one frames the first and second field image signals are inputted to the still video device. The image signals forming one frame are composed of a number of horizontal scanning lines H, and the image signal corresponding to one horizontal scanning line H is sandwiched between two synchronizing signals S, as shown in FIG. 3.

As described above, in the first field, the Y signals ($Y_1$, $Y_2$, $Y_3$, $Y_4$) corresponding to a left upper quarter field, a right upper quarter field, a left lower quarter field and a right lower quarter field are stored in the first through fourth areas of the memory. The image signals stored in the first through fourth areas are recorded on the first through fourth tracks of the magnetic disk D. Therefore, the Y signal ($Y_1$) corresponding to the left upper quarter field is recorded on the first track, and the Y signal ($Y_2$) corresponding to the right upper quarter field is recorded on the second track. The Y signal (Y, ) corresponding to the left lower quarter field is recorded on the third track, and the Y signal ($Y_4$) corresponding to the right lower quarter field is recorded on the fourth track. This is similar in the second field. Note, in the description of the embodiment, the Kth track does not mean the Kth track counted from the outermost track on the magnetic disk, but is a relative track number counted from a predetermined track.

The bandwidth of the Y signal inputted to the still video device is $f_H$, and the Y signal stored in the memory 26 has this bandwidth $f_H$. When read out from the memory 26, the Y signal is time-expanded four times. Namely, the bandwidth of the Y signals recorded on the magnetic disk D is $f_H/4$.

The bandwidth of the Y signal recorded on the magnetic disk D is limited by the structure of the disk device, and therefore, a Y signal having a wider bandwidth cannot be recorded on the disk D. In this embodiment, however, for one frame, the Y signal is divided into a plurality of parts to be stored in the memory 26, and then the divided Y signals are read out from the memory 26 while subjected to time-expansion, and are recorded on the magnetic disk D with a predetermined bandwidth. Accordingly, even when a bandwidth of the inputted Y signal is wider than that of the widest Y signal that can be recorded on the magnetic disk D, the content of the inputted Y signal can be recorded on the magnetic disk D. Namely, even when the Y signal of a high quality or high definition image is inputted to the still video device, the Y signal can be recorded on the magnetic disk D while maintaining the high quality thereof.

Figure 4:
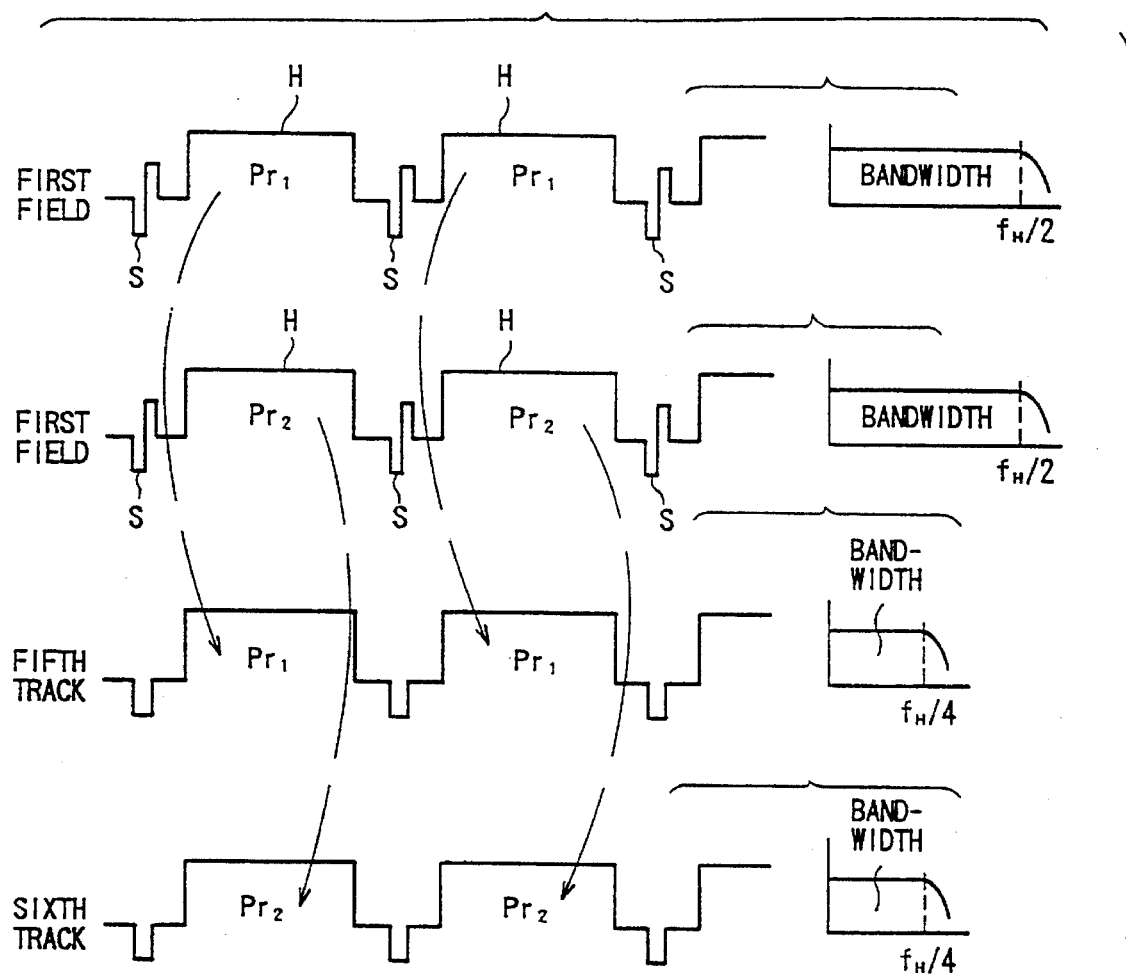
FIG. 4 is a diagram showing the relationship between a Pr signal inputted to a still video device and a Pr signal recorded on a magnetic disk in the embodiment.

FIG. 4 shows the relationship between a Pr signal inputted to the still video device and a Pr signal recorded on the magnetic disk D, when the Pr signal is recorded in the magnetic disk D in the high definition signal record mode (see FIG. 2).

In a first field, the Pr signals ($Pr_1$, $Pr_2$) corresponding to an upper half and a lower half are stored in a fifth area and a sixth area of the memory, respectively. The Pr signals stored in the fifth area and the sixth area of the memory are recorded on a fifth track and a sixth track of the magnetic disk D.

The bandwidth of the Pr signal inputted to the still video device is $f_H/2$, and the Pr signal is stored in the memory 27 with this bandwidth $f_H/2$. When read out from the memory 27, the Pr signal is time-expanded two times. Namely, the bandwidth of the Pr signals recorded on the magnetic disk D is $f_H/4$. Accordingly, even when a bandwidth of inputted Pr signal is wider than that of the widest Pr signal that can be recorded on the magnetic disk D, the content of the inputted Pr signal can be recorded on the magnetic disk D. Namely, even when the Pr signal of a high quality or high definition image is inputted to the still video device, the Pr signal can be recorded on the magnetic disk D while maintaining the high quality thereof.

Regarding the Pb signal, similarly, when read out from the memory 38, the Pb signal is time-expanded two times, and recorded on a seventh track and an eighth track of the magnetic disk D.

Programs by which a Y signal, a Pr signal and a Pb signal are recorded on the magnetic disk D in the high definition signal record mode are described below. Note, in this embodiment, the recording operation is carried out in order of the Y signal, the Pr signal and the Pb signal, and after the recording operation for the first field is completed, the recording operation for the second field is carried out.

Figure 5:
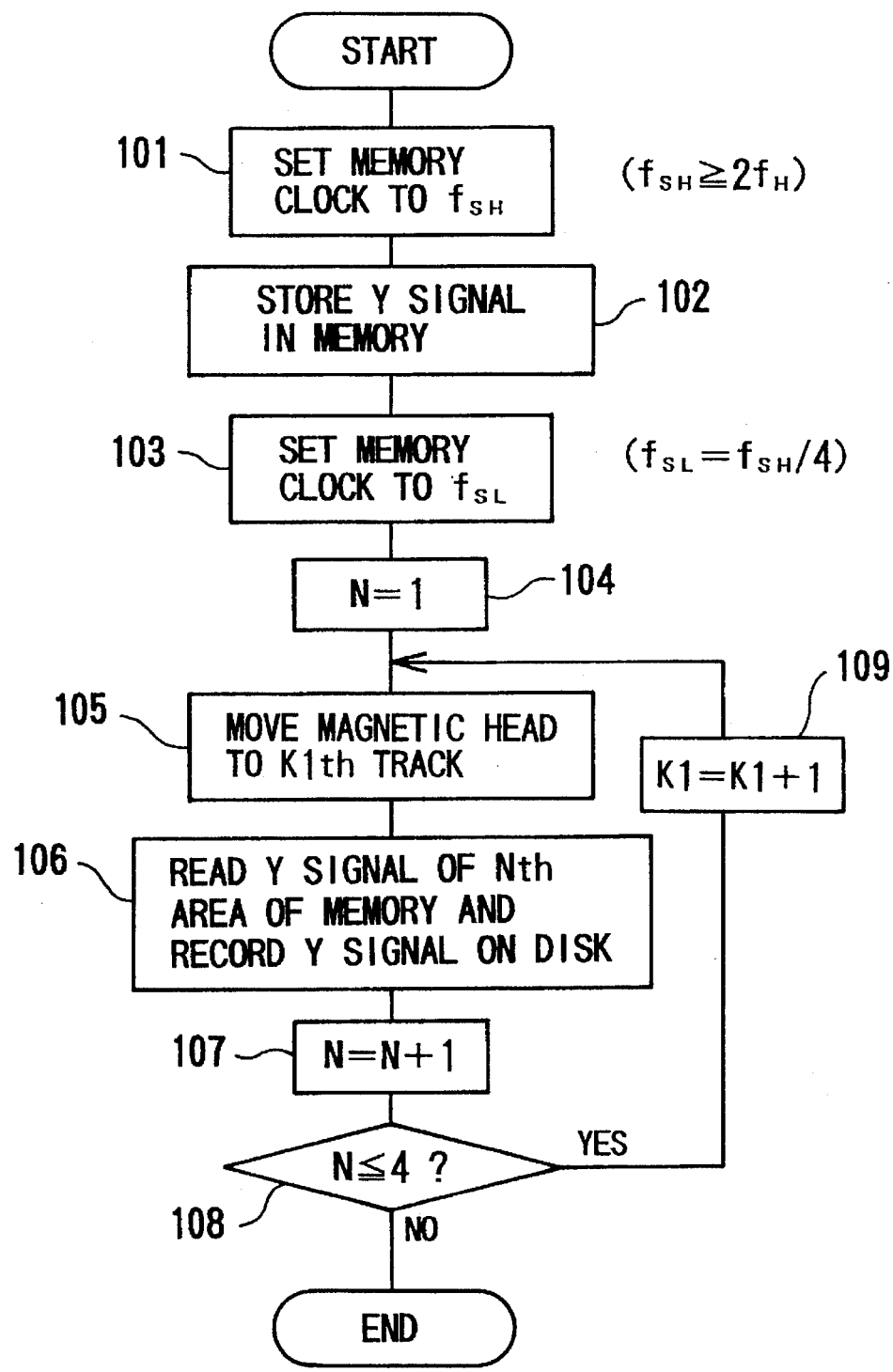
FIG. 5 is a flow chart of a program of a first embodiment, by which a Y signal is divided into four parts and stored in memories, and then time-expanded to be recorded on a magnetic disk)

FIG. 5 shows a flow chart of a program by which a Y signal is recorded on the magnetic disk D in the high definition signal record mode.

To A/D convert an inputted Y signal and store it in the memory 26, the Y signal must be sampled with a frequency of two or more times the bandwidth of the inputted Y signals, according to the Nyquist theorem. Therefore, in Step 101, the frequency of the memory clock is set to $f_{SH}$, which is equal to two or more times the bandwidth $f_H$ of the inputted Y signal. This memory clock is generated based on the standard clock signals outputted from the synchronizing-signal-generating circuit 34. In Step 102, the Y signal is A/D converted based on this memory clock, and is stored in the memory 26.

Then, in Step 103, the memory clock is set to $f_{SL}$ which is ¼ of the sampling frequency $f_{SH}$ of the inputted Y signal. In Steps 104 through 108, the Y signal in the memory 26 is D/A converted and recorded on the magnetic disk D. Namely, the Y signal is time-expanded by four times, in comparison with the inputted Y signals, to be recorded on the magnetic disk D.

In Step 104, a counter N is set to "1". In Step 105, the magnetic head 11 is moved to the K1th track. The initial value of the counter K1 is "1" if the magnetic disk has not been recorded at all. Then, in Step 106, the Y signal stored in the Nth area of the memory 26 is read out with a timing generated from the frequency $f_{SL}$, and is recorded on the magnetic disk D. In Step 107, the counter N is incremented by "1" and in Step 108 it is determined whether or not the counter N is less than or equal to "4". When the counter is less than or equal to "4", since reading out of all of the Y signals stored in all of the areas of the memory 26 has not been completed, the counter K1 is incremented by "1" in Step 109, and then the process after Step 105 is again executed. Conversely, when the counter N is higher than "4", all of the Y signals stored in all of the areas of the memory 26 have been read out, and therefore, the program is ended.

Figure 6A:
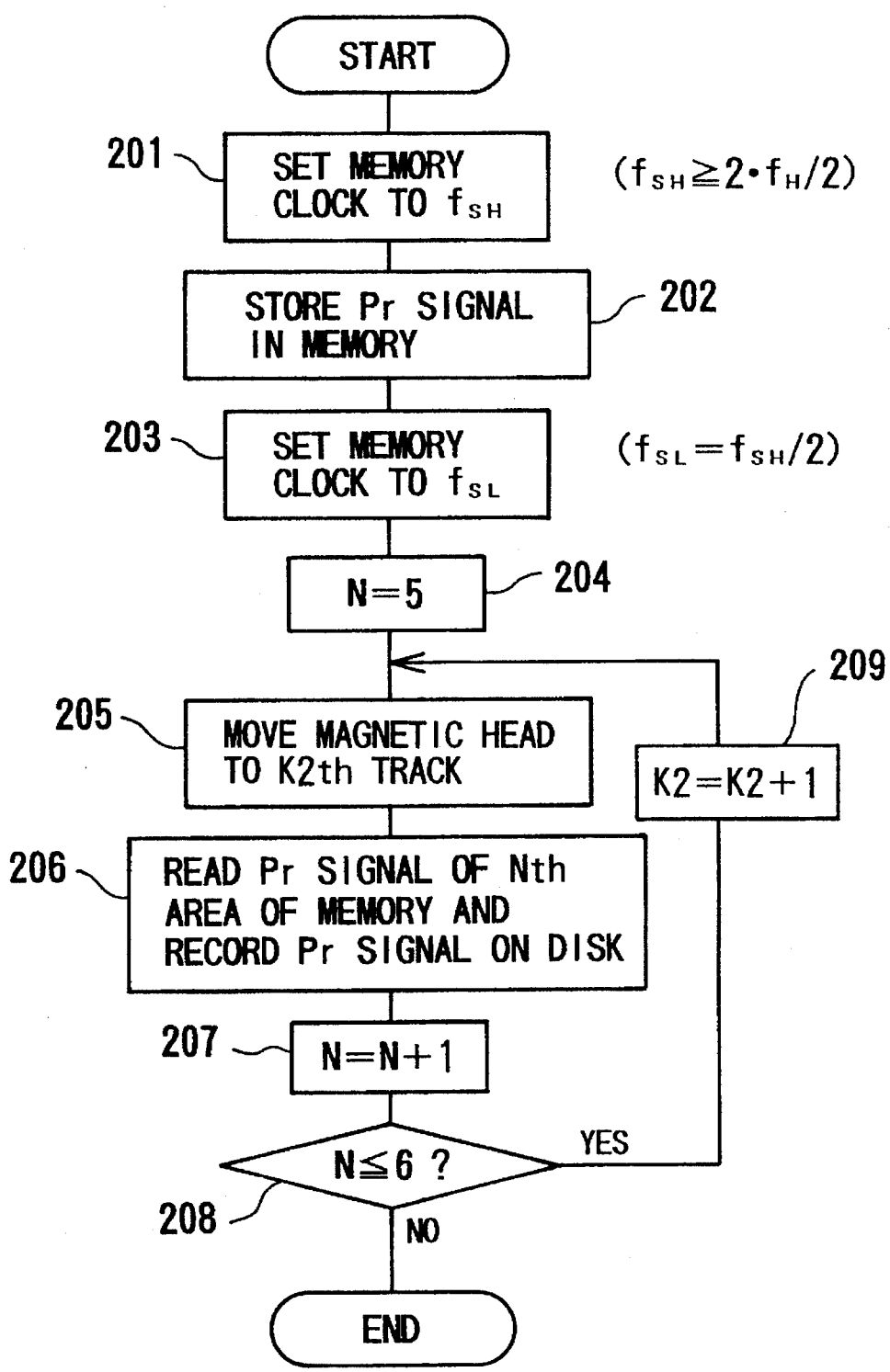
FIG. 6A is a flow chart of a program of the first embodiment, by which a Pr signal is divided into four parts and stored in memories, and then time-expanded to be recorded on a magnetic disk.

FIG. 6A shows a flow chart of a program by which a Pr signal is recorded on the magnetic disk D in the high definition signal record mode. This program is basically the same as the operation of recording the Y signal on the magnetic disk D, and each of the Steps corresponds to each of the Steps of FIG. 5.

Only steps in which the contents are different from those of FIG. 5 are described below.

In Step 202, a Pr signal is A/D converted and stored in the Pr-memory 27. In Step 204, the counter N is set to "5", and in Step 205, the magnetic head 11 is moved to the K2th track. The initial value of the counter K2 is "5" (=K1+4) if the initial value of the counter K1 was "1" in Step 105 of FIG. 5. Then, in Step 206, the Pr signal stored in the Nth area of the Pr-memory 27 is read out with a timing generated from the frequency $f_{SL}$, and is recorded on the magnetic disk D. In Step 208, it is determined whether the counter N is less than or equal to "6". When the counter is less than or equal to "6", since reading out of all of the Pr signals stored in all of the areas of the memory 27 has not been completed, the counter K2 is incremented by "1" in Step 209, and then the process after Step 205 is again executed. Conversely, when the counter N is higher than "6", all of the Pr signals stored in all of the areas of the memory 27 have been read out, and therefore, the program is ended.

Figure 6B:
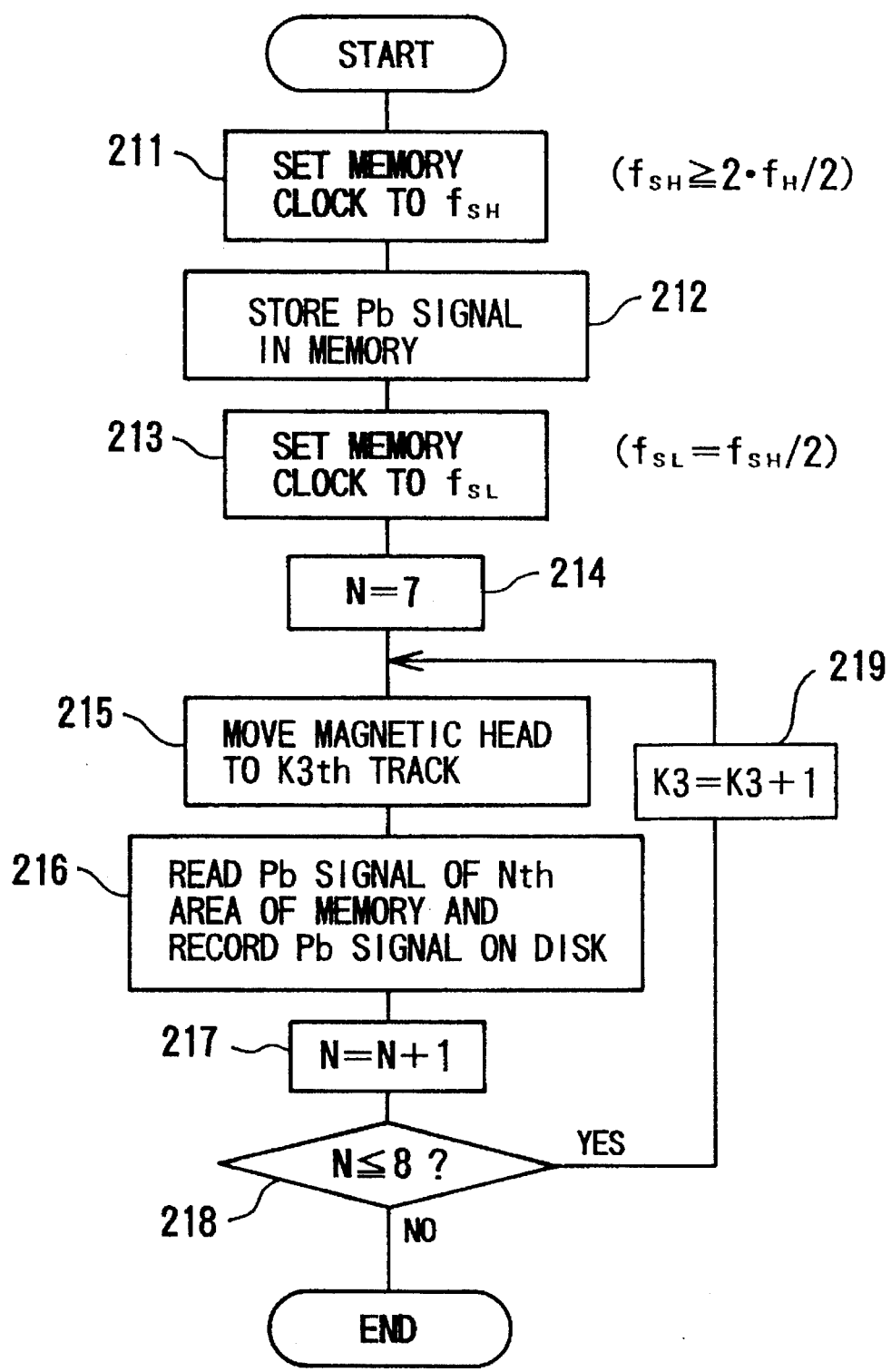
FIG. 6B is a flow chart of a program of the first embodiment, by which a Pb signal is divided into four parts and stored in memories, and then time-expanded to be recorded on a magnetic disk.

FIG. 6B shows a flow chart of a program by which a Pb signal is recorded on the magnetic disk D in the high definition signal record mode. This program is basically the same as the operation of recording the Pr signal on the magnetic disk D, and each of the Steps corresponds to each of the Steps of FIG. 6B.

Only steps in which the contents are different from those of FIG. 6B are described below.

In Step 212, a Pb signal is A/D converted and stored in the Pb-memory 28. In Step 214, the counter N is set to "7" and in Step 215, the magnetic head 11 is moved to the K3th track. The initial value of the counter K3 is "7" (=K2+2) if the initial value of the counter K1 was "1" in Step 105 of FIG. 5. Then, in Step 216, the Pb signal stored in the Nth area of the Pb-memory 28 is read out with a timing generated from the frequency $f_{SL}$, and is recorded on the magnetic disk D. In Step 218, it is determined whether the counter N is less than or equal to "8". When the counter is less than or equal to "8", since reading out of a 11 of the Pb signals stored in all of the areas of the memory 28 has not been completed, the counter K3 is incremented by "1" in Step 219, and then the process after Step 215 is again executed. Conversely, when the counter N is higher than "8", all of the Pb signals stored in all of the areas of the memory 28 have been read out, and therefore, the program is ended.

Figure 7:
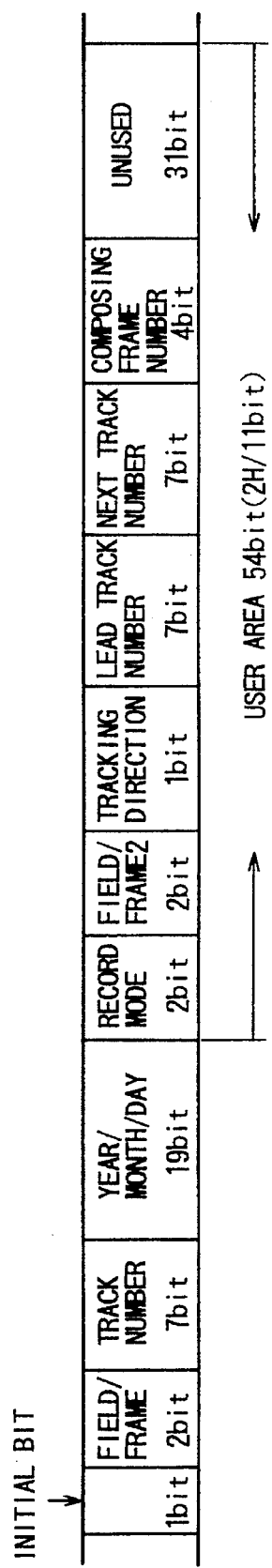
FIG. 7 is a diagram showing a track area of the magnetic disk in which ID codes are recorded.

On the magnetic disk, besides image signals, ID codes relating to the image signal are recorded. The ID codes indicate a recording mode, a photographing date, and so on. FIG. 7 shows a track area of the magnetic disk on which the ID codes are recorded. In this drawing, "H" refers to one horizontal scanning line. The construction of the ID code is the same as that used in a conventional still video device, and is provided with a user area. In this embodiment, information necessary for automatically carrying out operations such as a division of a frame, a time-expansion and a reading of image signals, are recorded in the user area.

Note, the programs of FIGS. 5, 6A and 6B show recording operations of image signals of the first field, and regarding the second field, recording operations are carried out similarly to the first field. In the recording operations of the second field, the initial values of the counter N set in Steps 104, 204 and 214 are "9", "13" and "15" respectively.

Further note, in the portion outside the user area, information which is the same as in a conventional device is recorded. Namely, in a field/frame information storing area which is provided adjacent to the initial bit, information indicating whether the image signal is recorded in the field record mode or the frame record mode is recorded.

The user area has 2 bits for indicating "RECORD MODE", 2 bits for indicating information of "FIELD/FRAME2" 1 bit for indicating "TRACKING DIRECTION" 7 bits for indicating "HEAD TRACK NUMBER"; 7 bits for indicating "NEXT TRACK NUMBER" and 4 bits for indicating "COMPOSING FRAME NUMBER". There is a 31-bit unused area. With reference to FIGS. 8 through 15, the contents of the information are described.

FIG. 8 shows "RECORD MODE" information.

A normal-signal/normal-record mode means a mode in which an image signal is recorded on a magnetic disk without dividing the frame. Namely, the normal-signal/normal-record mode is the same record mode (a normal record mode) as a conventional still video device. The normal-signal means an image signal generated in accordance with the NTSC system, for example. FIG. 9 shows a mode in which the image signals are recorded in the normal-signal/normal-record mode. Image signals ($Y_1$, $Pr_1$, $Pb_1$) of a first field are recorded on one track, and image signals ($Y_2$, $Pr_2$, $Pb_2$) of a second field are recorded on another track. The normal-signal/normal-record mode is indicated by setting the two bits to "00".

In this mode, the number of tracks used for recording one frame is determined in accordance with a record mode signal stored in the "FIELD/FRAME" recording area provided adjacent to the initial bit of the ID code. Namely, when the record mode signal indicates the field record mode, only a first field image signal is recorded, and when the record mode signal indicates the frame record mode, first and second field image signals are recorded. Note, the record mode signal stored in "FIELD/FRAME" recording area is ignored except in the normal-signal/normal-record mode.

A normal-signal/high-definition record mode means a mode in which a frame is not divided to record an image signal on a magnetic disk, and a Y signal is recorded on a different track from those of a Pr signal and a Pb signal. FIG. 10 shows a mode in which the image signals are recorded in the normal-signal/high-definition record mode. A Y signal ($Y_1$) of a first field is recorded on a first track, a Pr signal ($Pr_1$) and a Pb signal ($Pb_1$) of the first field are recorded on a second track. A Y signal ($Y_2$) of a second field is recorded on a third track, a Pr signal ($Pr_2$) and a Pb signal ($Pb_2$) of the second field are recorded on a fourth track. The normal-signal/high-definition record mode is indicated by setting the two bits to "01".

A high-definition-signal record mode means a mode in which an image signal is divided with respect to the frame and recorded on separate tracks in the frame record mode, as described above with reference to FIGS. 2 through 6. The high-definition-signal record mode is indicated by setting the two bits to "10".

A normal-signal/separating-track/frame-record mode means a mode in which an image signal is recorded on a magnetic disk in a frame record mode without dividing the frame, and image signals of two fields are recorded on tracks which are not adjacent to each other. Namely, in this mode, a Y signal ($Y_1$), a Pr signal ($Pr_1$) and a Pb signal ($Pb_1$) are multiplex-recorded on one track, similarly to the normal record mode (FIG. 9), and the image signals of the first field and the second field can be recorded on tracks which are not adjacent to each other. The normal-signal/separating-track/frame-record mode is indicated by setting the two bits to "11".

FIG. 11 shows "FIELD/FRAME2" information. This information is referred to when "RECORD MODE" (FIG. 8) does not indicate the normal-signal/normal-record mode, and shows whether the image signal has been recorded in the field record mode or the frame record mode. In case of the high-definition-signal record mode shown in FIG. 2, for example, "01" is set on each of the first through eighth tracks on which first field image signals are recorded, and "10" is set on each of the ninth through sixteenth tracks on which second field image signals are recorded. When image signals are recorded in the field record mode, the "FIELD/FRAME2" bits are set to "00" in each track.

FIG. 12 shows "TRACKING DIRECTION" information. This information indicates whether a plurality of tracks on which image signals forming one frame are recorded are arranged from the outside to the inside of the magnetic disk, or from the inside to the outside of the magnetic disk. In other words, this information indicates whether the magnetic head 11 should be moved from the outside to the inside of the magnetic disk or from the inside to the outside of the magnetic disk, to reproduce one frame image. In an example shown in FIG. 2, since the first through sixteenth tracks are arranged from the outside to the inside of the magnetic disk, the "TRACKING DIRECTION" bit is set to "0" in each track.

FIG. 13 shows "HEAD TRACK NUMBER" information. In the high-definition-signal record mode, as described above, an image signal forming one frame is divided into a plurality of parts, and thus the frame is divided into a plurality of composing frames. In a reproduction operation, the composing frames are reproduced in a predetermined order. The "HEAD TRACK NUMBER" information shows an absolute track number of a track in which a lead composing frame, which should be reproduced first, is recorded. The number of tens of the track number is represented by 3 high-order bits (GFE), and the number of units of the track number is represented by 4 low-order bits (DCBA). In an example shown in FIG. 2, when the absolute track number of the first track on which the Y signal ($Y_1$) is recorded is "16" the information "0010110" ("16" in decimal notation) is stored in the "HEAD TRACK NUMBER" bits of all of the other tracks in which the image signals forming the same frame as the first track are recorded.

FIG. 14 shows "NEXT TRACK NUMBER" information. This information indicates the absolute track number of the track on which the next composing frame is recorded. The number of tens of the track number is represented by 3-high-order bits (GFE), and the number of units of the track number is represented by 4low-order bits (DCBA). In an example shown in FIG. 2, when the next track number, after the first track on which the Y signal ($Y_1$) is recorded, is "0110010" ("32" in decimal notation), the absolute track number of the second track on which the Y signal ($Y_2$) is recorded is "32". Note, the next track number is not necessarily the track number of the track adjacent to a first track on which the information is recorded. Namely, the next composing frame may be recorded on a track separated from the first track.

FIG. 15 shows "COMPOSING FRAME NUMBER" information. This information indicates to which part of a frame the image signal stored in the track corresponds. The number of tens in the composing frame number is represented by 2high-order bits (DC), and the number of units in the composing frame number is represented by 2 low-order bits (BA). In an example shown in FIG. 2, "0001" ("1" in decimal notation) is recorded on the first track on which the Y signal ($Y_1$) is recorded, and "0010" ("2" in decimal notation) is recorded in the second track on which the Y signal ($Y_2$) is recorded.

The information such as the record mode is DPSK-modulated by the ID record processing circuit 37 (FIG. 1), and recorded on the magnetic disk D. As described below, the information is read out from the magnetic disk, DPSK-demodulated, decoded and used for reproducing the image.

Figure 16:
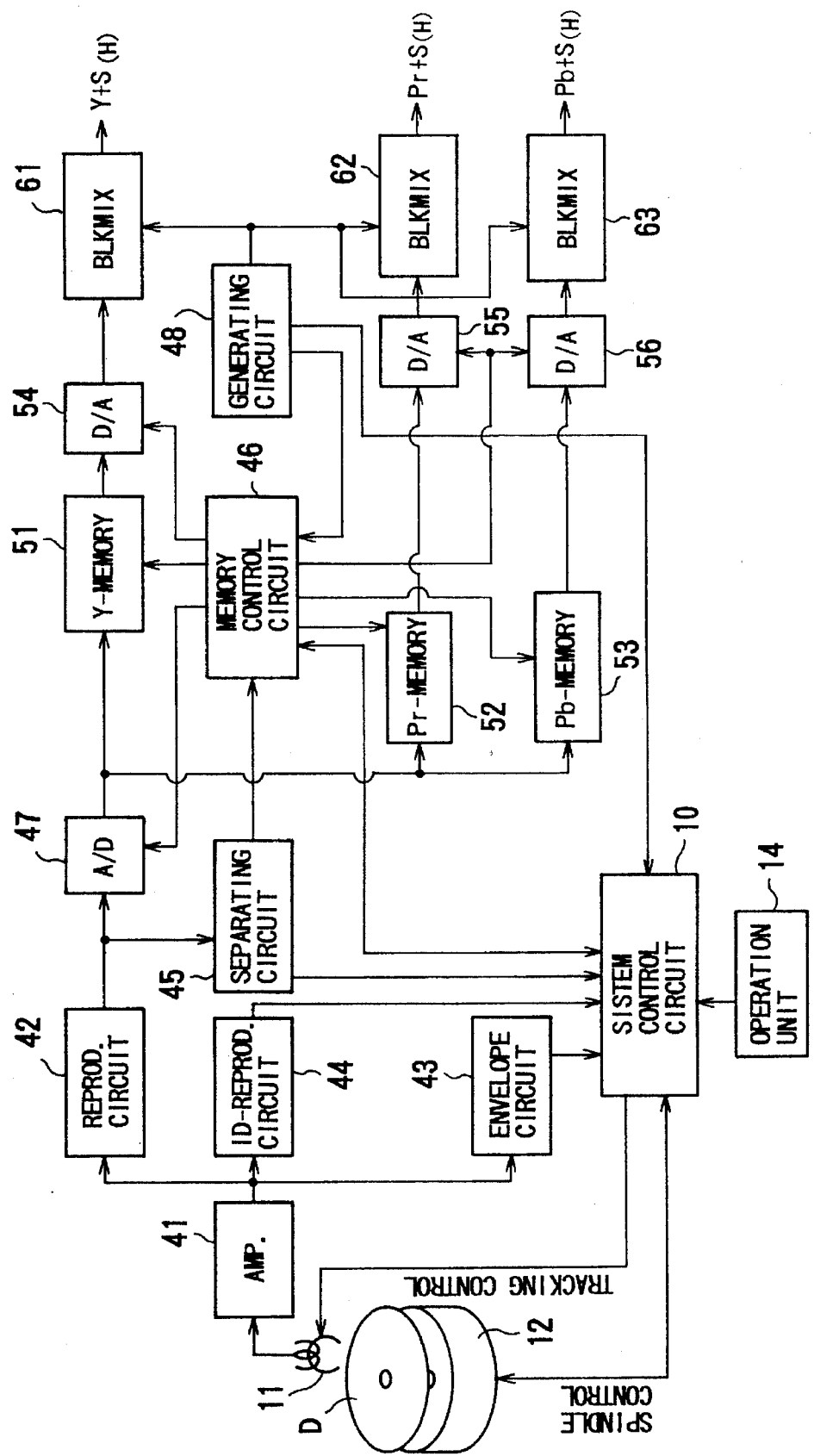
FIG. 16 is a block diagram of a reproducing system of the still video device.

FIG. 16 shows a block diagram of a reproducing system for the still video device.

The system control circuit 10, the magnetic head (reproduction head) 11, the spindle motor 12 and the operation unit 14 are also included in the recording system shown in FIG. 1; i.e., are provided for both the recording system and the reproducing system.

The magnetic head 11 is positioned at a predetermined track on the magnetic disk D, so that an ID code and an image signal recorded on the track can be reproduced. A reproducing amplifier 41 reads the image signal and the ID code recorded on the magnetic disk D, and outputs the same to a reproduction process circuit 42, an envelope detection circuit 43, and an ID-reproduction process circuit 44. The reproduction process circuit 42 frequency-demodulates and outputs the Y signal including synchronizing signals, the Pr signal and the Pb signal. The envelope detection circuit 43 senses the envelope signals of the Y signal, the Pr signal and the Pb signal, so that it is determined whether the reproduced track is a blank track. The ID-reproduction process circuit 44 DPSK-demodulates and outputs the ID code.

A synchronizing signal S included in the Y signal is separated from the Y signal by a synchronizing-signal-separating circuit 45, and transmitted to a memory control circuit 46 and the system control circuit 10. The memory control circuit 46 controls A/D converter 47, a Y-memory 51, a Pr-memory 52 and a Pb-memory 53, based on the synchronizing signal S. Further, the memory control circuit 46 controls D/A converter 54, the Y-memory 51, the Pr-memory 52 and the Pb-memory 5;3, based on a synchronizing signal outputted from a synchronizing-signal-generating circuit 48 described later.

The Y signal including the synchronizing signal is A/D converted by the A/D converter 47, and the Y signal recorded between two synchronizing signals is stored in the Y-memory 51 under the control of the memory control circuit 46. The Y signal stored in the Y-memory 51 is D/A converted by the D/A converter 54, based on a synchronizing signal (a standard clock signal) outputted from the synchronizing signal generating circuit 48.

Similarly, the Pr and Pb signals are A/D converted by the A/D converter 47, and stored in the Pr-memory 52 and the Pb-memory 53, respectively. The Pr and Pb signals are outputted from the Pr-memory 52 and the Pb-memory 53, based on the standard clock signal, and inputted to D/A converters 55 and 56 to be D/A converted under the control of the memory control circuit 46.

The standard clock signal used for reading the Y signal from the Y-memory 51 has a frequency having a value which is four times, for example, that of the standard clock signal used for storing the Y signal in the Y-memory 51. Therefore, the Y signal is read from the memory 51 at a high speed, whereby the Y signal is time-compressed. The standard clock signal used for reading the Pr and Pb signals from the Pr-memory 52 and the Pb-memory 53 has a frequency having a value which is twice, for example, that of the standard clock signal used for storing the Pr and Pb signals in the Pr-memory 52 and the Pb-memory 53. Therefore, the Pr and Pb signals are read from the memories 52 and 53 at a high speed, whereby the Pr and Pb signals are time-compressed.

Blanking sync mix circuits 61, 62 and 63 are provided for setting a predetermined portion in front of the Y signal, the Pr signal and the Pb signal to zero level, and superimposing a synchronizing signal on that portion. Accordingly, by an operation of the blanking sync mix circuits 61, 62 and 63, a clear synchronizing signal which conforms to a system such as the HDTV system is added to a portion in front of these signals. Each of the Y, the Pr and Pb signals outputted from the blanking sync mix circuits 61, 62 and 63 are inputted to a display device, not shown.

An ID code recorded on the magnetic disk D is subjected to a process such as a DPSK-demodulation in the ID-reproduction process circuit 44, and then decoded by the system control circuit 10. Accordingly, the system control circuit 10 recognizes information such as the record mode, so that a predetermined image is reproduced.

Figure 17:
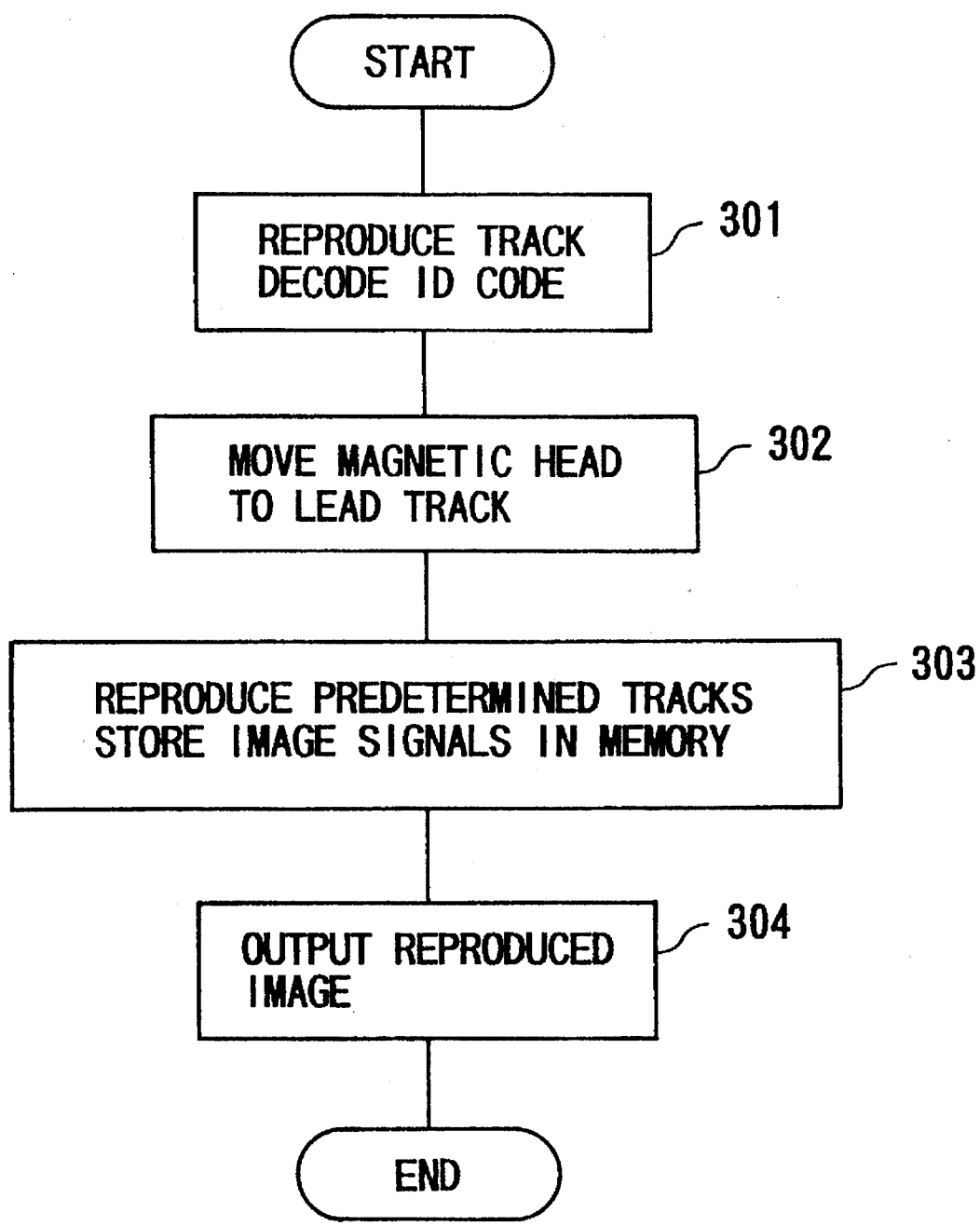
FIG. 17 is a flow chart of a program Of the first embodiment, by which image signals recorded on a magnetic disk are reproduced.

FIG. 17 shows a flow chart of a program by which image signals recorded on a magnetic disk D are reproduced.

In Step 301, the track at which the magnetic head 11 is positioned at that time is reproduced, and thus, the ID code recorded on the track is decoded. Namely, the information such as the record mode, the field/frame2, the tracking direction, the lead track number, the next track number and the composing frame number is decoded. In Step 302, the magnetic head 11 is moved to the lead track in accordance with the lead track number information, which is the absolute track number of the track on which the lead composing frame is recorded, among the tracks in which image signals forming the same frame as the image signal recorded on the lead track are recorded.

In Step 303, the magnetic head 11 is moved in accordance with the tracking direction information so that a predetermined track is reproduced, and the image signals are stored in predetermined areas of the memories 51 through 53. In Step 304, the image signals stored in the memories 51 through 53 are read out and and the image is displayed on the display device.

As described above, according to the still video device of the above embodiment, image signals having a higher quality can be recorded in a recording medium, and can be reproduced from the recording medium, in comparison with a conventional still video device. Further, since the lead track number is recorded in the ID code recording part of each track, wherever the magnetic head 11 is located when starting a reproduction, the magnetic head 11 is automatically positioned at the lead track. Therefore, the whole frame can be always reproduced. Still further, in the embodiment, the tracking direction information is recorded in the ID code recording part, and the tracks are reproduced based on the information. Therefore, when recording image signals on a track, it is not necessary that the tracking direction is limited to a single direction, such as from the outside to the inside of the magnetic disk, for example, and therefore, the degree of freedom of the recording operation is improved.

Figure 18:
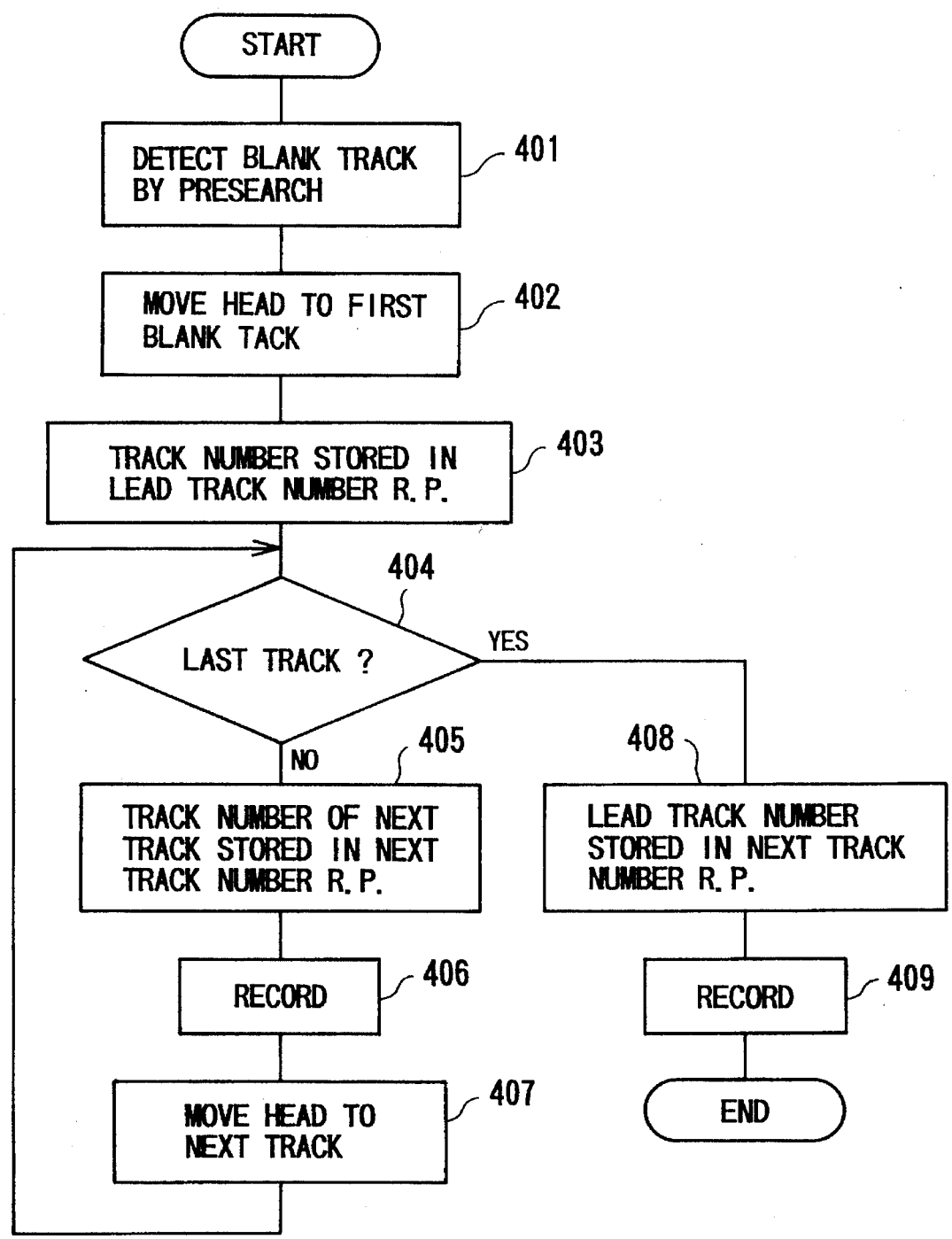
FIG. 18 is a flow chart of a program of a second embodiment, by which image signals are recorded on a magnetic disk in which consecutive blank tracks do not exist.

FIG. 18 shows a flow chart of a program of a second embodiment. By this program, image signals are recorded on the magnetic disk D in which consecutive blank tracks do not exist.

In Step 401, a presearch is executed. Namely, image signals recorded on all of the tracks of the magnetic disk D are reproduced, and when the amount of an envelope signal obtained by the envelope detection circuit 43 is smaller than a predetermined value, it is determined that the track is a blank track, and thus data indicating the blank track is stored in a memory of the system control circuit 10.

In Step 402, the magnetic head 11 is moved to the first blank track, i.e., the track positioned at the outermost position of the magnetic disk D among all the blank tracks. In Step 403, the track number of the first blank track is recorded in a lead track number recording part of the ID code (FIG. 7) as a lead track number (i.e., a track at which a recording operation is started). When the track number of the first blank track is "16", for example, the lead track number is "16" (FIG. 13).

In step 404, it is determined whether a recording operation for the last track is going to be carried out right after this step, i.e., it is determined whether the last of the image signals composing one frame are going to be recorded on the track at which the magnetic head 11 is positioned. This determination is carried out based on information such as the record mode set by the photographer. When the high-definition-signal record mode and the frame record mode are selected as shown in FIG. 2, since image signals of one frame are recorded on sixteen tracks, it is determined in Step 404 whether or not the magnetic head 11 is positioned at the sixteenth track. When Step 404 is executed for the first time, since the recording operation of the last track has not been completed, the process goes to Step 405, in which the track number of the blank track to be subsequently recorded is stored, in the next-track-number recording part of the ID code (FIG. 7), as the next track number.

In Step 406, the image signal is recorded on the track. In Step 407, the magnetic head 11 is moved to the next track, and then Step 404 is executed again so that it is determined whether the recording operation for the last track is to be carried out. When the recording operation for the track ahead of the last track has been completed and the magnetic head 11 has been moved to the last track by the execution of Steps 404 through 407, the process goes from Step 404 to Step 408, in which the lead track number is recorded in the next-track-number recording part of the ID code (FIG. 7) of the last track. Note, a meaningless number may be recorded in the next-track-number recording part of the ID code of the last track.

Then, in Step 409, an image signal is recorded on the last track, and thus recording of all of the image signals for one frame is completed.

Figure 19:
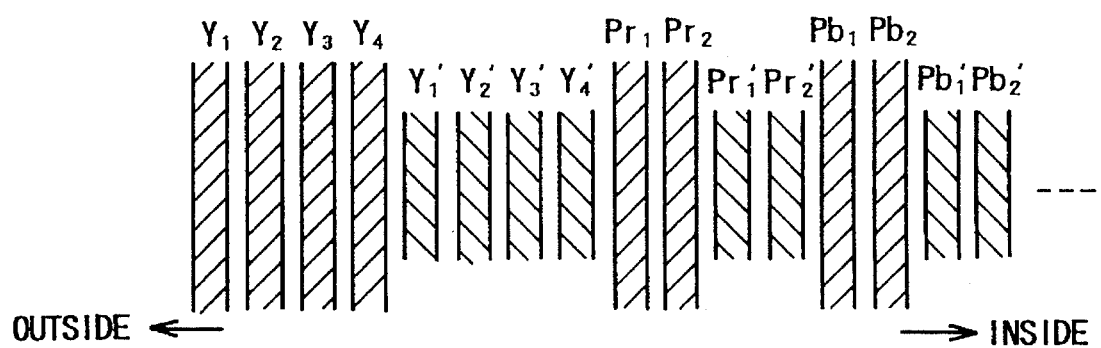
FIG. 19 is a diagram showing an example in which image signals are recorded on non-consecutive tracks on a magnetic disk.

FIG. 19 shows an example in which image signals are recorded on tracks which are not consecutive on the magnetic disk D. In this drawing, the Y signals ($Y_1, Y_2, Y_3, Y_4$), the Pr signals ($Pr_1, Pr_2$) and the Pb signals ($Pb_1, Pb_2$) have been recorded on blank tracks, existing between tracks on which these signals have been recorded, and the Y signals ($Y'_1, Y'_2, Y'_3, Y'_4$), the Pr signals ($Pr'_1, Pr'_2$) and the Pb signals ($Pb'_1, Pb'_2$) have been subsequently recorded.

Figure 20:
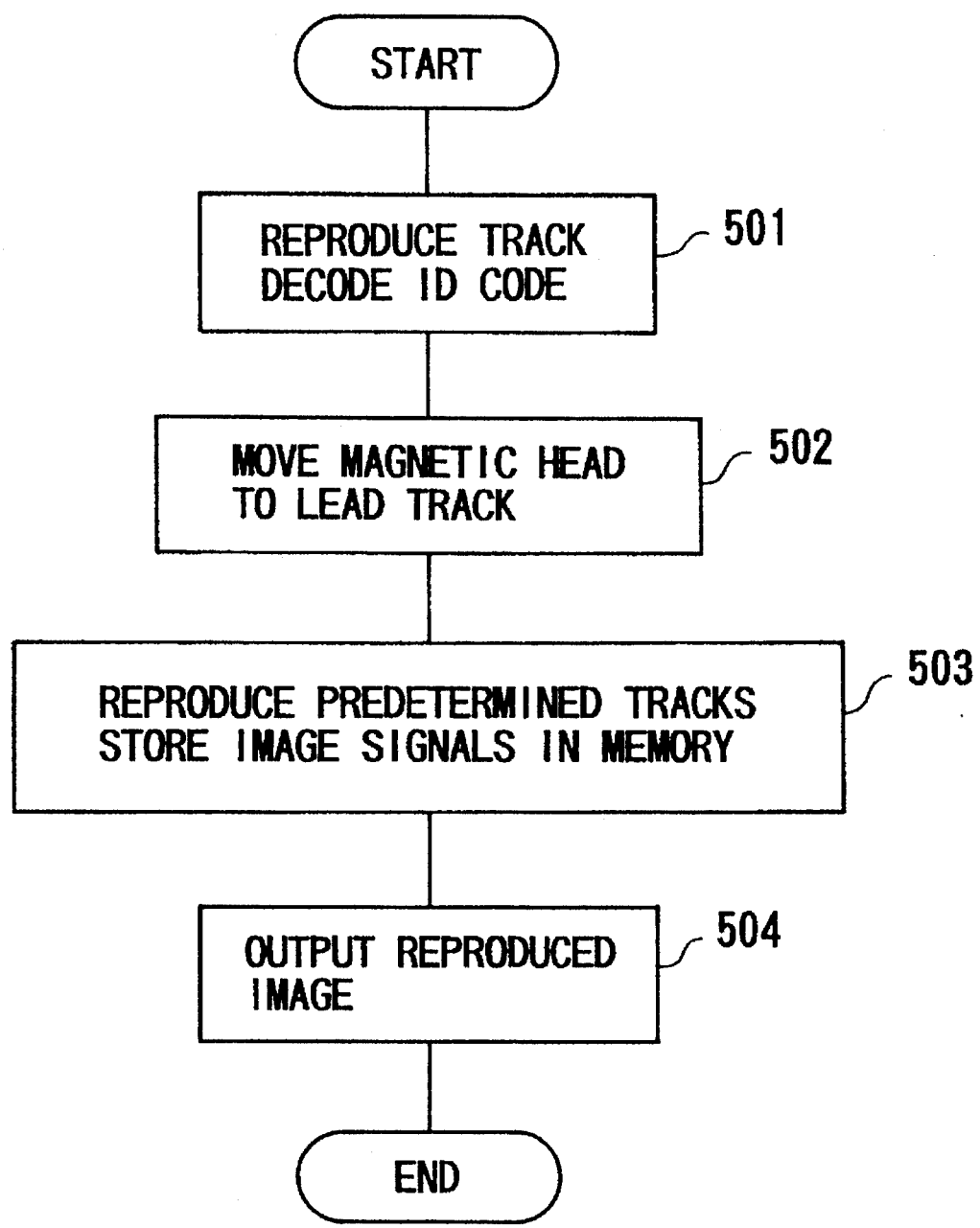
FIG. 20 is a flow chart of a program of the second embodiment by which image signals recorded on a magnetic disk are reproduced.

FIG. 20 shows a flow chart of a program of the second embodiment by which image signals recorded on a magnetic disk D are reproduced.

The contents of Steps 501 and 502 are the same as those of Steps 301 and 302 of FIG. 17, respectively. In Step 503, the magnetic head 11 is moved in accordance with the tracking direction information so that a predetermined track is reproduced, and the image signals are stored in predetermined areas of the memories 51 through 53. Namely, the image signals recorded on the track are stored in predetermined areas of the memories 51 through 53, and then, the magnetic disk 11 is moved to the next track in accordance with the next track number information stored in the ID code recording part, so that the next image signals are stored in the memories 51 through 53. Such a process is repeatedly executed, so that all of image signals forming one frame are stored in memories 51 through 53. Then, in Step 504, the image signals stored in the memories 51 through 53 are read out and the image is displayed on the display device.

As described above, the second embodiment is constructed in such a manner that the lead track number (i.e., frame-identifying-information) and the next track number (i.e., divided-part-information) are recorded in the ID code recording part of each track of the magnetic disk D. Therefore, even if consecutive blank tracks do not exist on the magnetic disk D, image signals forming one frame can be recorded on non-consecutive blank tracks, and these tracks can be reproduced in a predetermined order so that one frame image is outputted to a display device. Accordingly, the efficiency of using the magnetic disk is improved.

Figure 21:
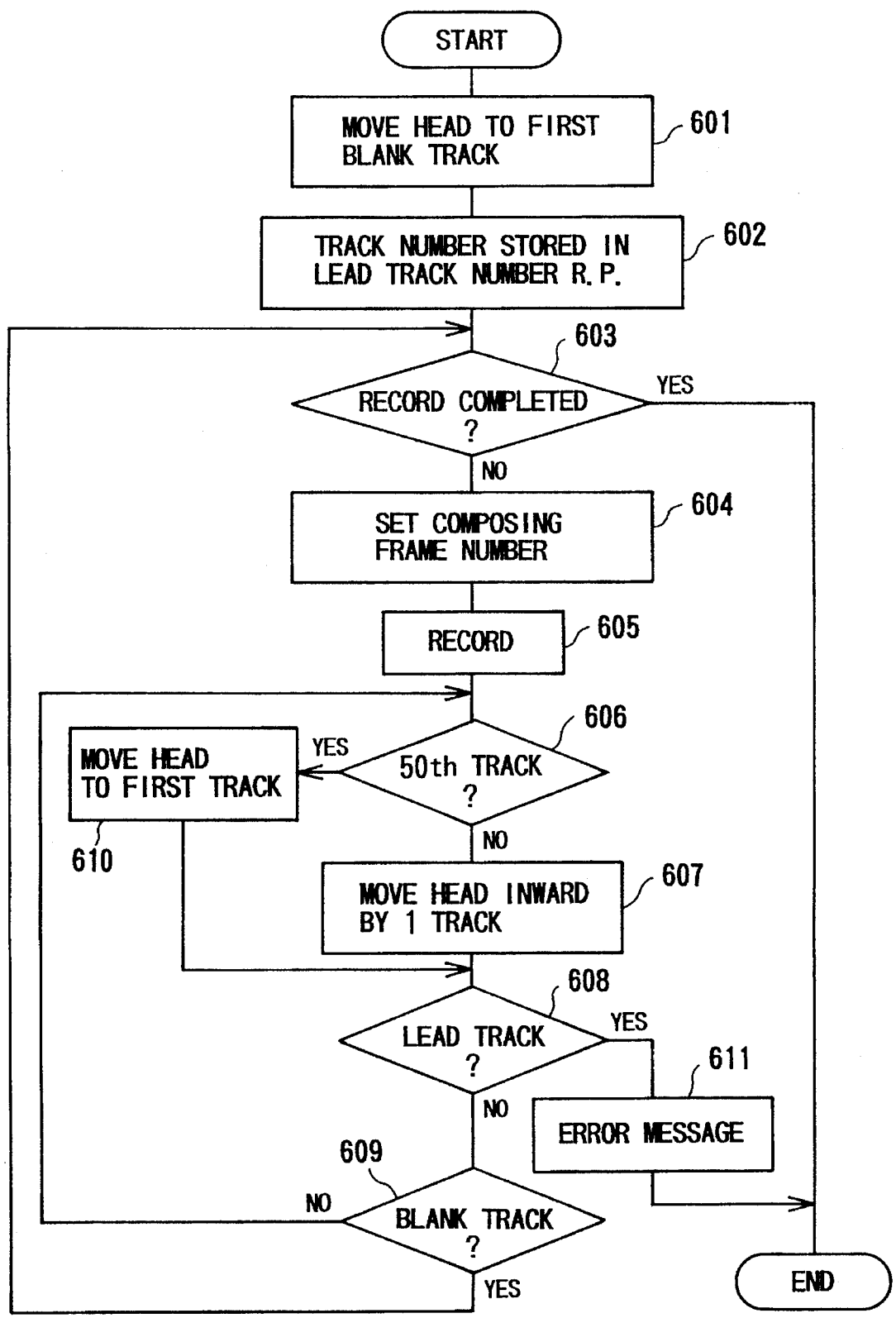
FIG. 21 is a flow chart of a program of a third embodiment, by which image signals are recorded on a magnetic disk in which consecutive blank tracks do not exist.

FIG. 21 shows a flow chart of a program of a third embodiment by which image signals are recorded on a magnetic disk D in which consecutive blank tracks do not exist.

In Step 601, the magnetic head 11 is moved to a first blank track. This operation is carried out as follows: First, an image signal of the track at which the magnetic head 11 is positioned at that time is reproduced, and it is determined whether or not the amount of an envelope signal obtained by the envelope detection circuit 43 is smaller than a predetermined value. When the envelope signal is larger than the predetermined value, it is determined that an image signal has been recorded on the track. Therefore, the magnetic head 11 is moved inward on the magnetic disk D by one track, and the amount of the envelope signal is again determined. When a track in which the envelope signal is smaller than the predetermined value is detected, it is determined that the track is a blank track.

In Step 602, the track number of the first blank track obtained at Step 601 is stored in a memory of the system control circuit 10, as a lead track number which is the number of a track at which a recording operation can be started. When the number of the track is "16", for example, the lead track number is "16" (FIG. 13). This lead track number is recorded in a predetermined track, with an image signal, in Step 605 as described later.

In Step 603, it is determined whether a recording operation has been completed for the predetermined number of tracks. This determination is carried out based on information such as the record mode set by the photographer. When the high-definition-signal record mode and the frame record mode are selected as shown in FIG. 2, since image signals of one frame are recorded on sixteen tracks, it is determined in Step 603 whether recording operations for sixteen tracks have been completed. When Step 603 is executed for the first time, since recording operations for the predetermined numbers of tracks have not been completed, the process goes to Step 604 to record an image signal on a blank track.

In Step 604, a composing-frame number corresponding to an image signal recorded in Step 605 is set. When Step 604 is executed for the first time, the lead composing-frame number "01" is set. Then, in Step 605, an image signal and information such as the lead track number and the composing-frame number are recorded on the track. When Step 605 is executed for the first time, an image signal (Y signal ($Y_1$) in FIG. 2) of the lead composing-frame number is recorded in an image signal recording part of the track, and the lead track number, the composing-frame number and so on are recorded in an ID code recording part of the track.

In Step 606, it is determined whether the magnetic head 11 is positioned at the 50th track which is the innermost track of the magnetic disk D. When the magnetic head 11 is not positioned at the 50th track, in Step 607, the magnetic head 11 is moved inward on the magnetic disk D by one track. In Step 608, it is determined whether the magnetic head 11 is returned to the lead track, i.e., the first blank track. In the initial stage of the recording operation, since the magnetic head 11 is not returned immediately to the lead track the process goes to Step 609, in which it is determined whether a track to which the magnetic head 11 is moved is a blank track, based on the envelope signal as described above. When it is not a blank track, the process returns to Step 606, and when it is a blank track, the process returns to Step 603. By such executions of Steps 603 through 609, each image signal is recorded on a predetermined track with various information, in the order of the composing frame number.

As a result of the above recording operation, when it is determined in Step 603 that recording operation of the predetermined number of tracks has been completed, this program is ended.

When it is determined in Step 606 that the magnetic head 11 is positioned at the 50th track, the process goes to Step 610, at which the magnetic head 11 is moved to the first track which is the outermost track of the magnetic disk D. Then, Step 608 and the following Steps are executed, and thus an image signal, an ID code and so on are recorded on a blank track, as described above.

Note, if the number of blank tracks is not enough to record all the image signals forming one frame, the magnetic head 11 is returned to a lead track, due to the execution of Step 607. In this case, the process goes from Step 608 to Step 611, in which an error message meaning lack of blank tracks is displayed on the display device, and this program is ended.

The image signals recorded on the tracks according to the third embodiment are as shown in FIG. 19, for example.

Figure 22:
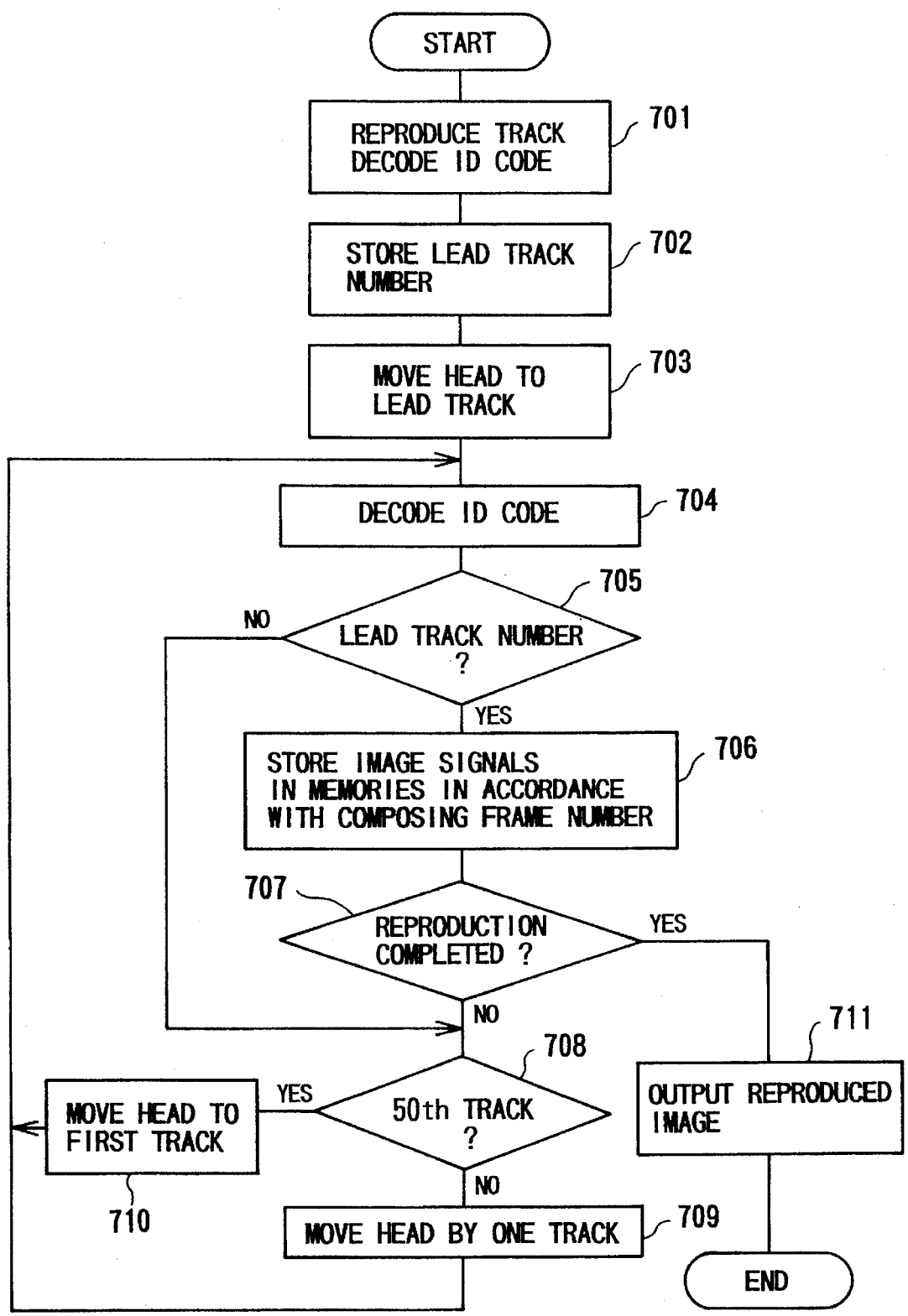
FIG. 22 is a flow chart of a program of the third embodiment by which image signals recorded on a magnetic disk are reproduced.

FIG. 22 shows a flow chart of a program of the third embodiment by which image signals recorded on the magnetic disk D are reproduced.

In Step 701, the track at which the magnetic head 11 is positioned is reproduced and the ID code recorded on the track is decoded. Namely, information such as the record mode, the field/frame2 setting, the tracking direction, the lead track number, the next track number and the composing frame number is decoded. In Step 702, the lead track number is stored in the memory of the system control circuit 10 (FIG. 1) for the following process, and in Step 703, the magnetic head 11 is moved to the lead track.

In Step 704, the ID code is read out and information such as the record mode is decoded. In Step 705, it is determined whether the lead track number decoded in Step 704 is coincident with the lead track number stored in the memory in Step 702. In all of the tracks which are now expected to be reproduced, the same lead track number is stored. Therefore, when the lead track number decoded in Step 704 is coincident with the lead track number stored in the memory, i.e., when the magnetic head 11 is positioned at the track which should be reproduced, Step 706 and the following steps are executed.

When it is determined in Step 705 that the lead track number decoded in Step 704 is not coincident with the lead track number stored in the memory, since the magnetic head 11 is not positioned at the track to be reproduced, Steps 706 and 707 are skipped, and the process goes to Step 708.

In Step 706, the image signals are stored in predetermiend areas of the memories 51 through 53. The predetermined areas correspond to the composing frame numbers of the image signals, and for example, the image signals of the lead composing frame number are stored in first areas of the memories 51 through 53. In Step 707, it is determined whether the reproducing operation for the predetermined number of tracks has been completed. This determination is carried out based on the RECORD MODE information (FIG. 8) and FIELD/FRAME2 setting (FIG. 11) stored in the ID code recording areas. Namely, as shown in FIG. 2, for example, when the high-definition-signal record mode and the frame record mode are selected, since the image signals of one frame are recorded in 16 tracks, it is determined in Step 707 whether a reproducing operation for 16 tracks has been completed. When Step 707 is executed for the first time, since a reproducing operation for the predetermined number of tracks has not been completed, the process goes to Step 708, in which it is determined whether the magnetic head 11 is positioned on the 50th track. When the magnetic head 11 is not positioned on the 50th track, the magnetic head 11 is moved inwardly by one track on the magnetic disk D in Step 709, and the process returns to Step 704.

Steps 704 through 709 are repeatedly executed, so that image signals of all of the tracks to be reproduced are stored in the memories 51 through 53. Then, the process goes from Step 707 to Step 711, and the image signals stored in the memories 51 through 53 are read out in order of predetermined areas, i.e., the composing frame numbers, so that the reproduced image is outputted to a display device.

During Steps 704 through 709, if it is determined in Step 708 that the magnetic head 11 is positioned at the 50th track, the process goes to Step 710, in which the magnetic head 11 is moved to the first track. Then, Step 704 and the following Steps are executed, as described above, and after all of the image signals to be reproduced are stored in the memories 51 through 53, the image signals stored in the memories are read out in the predetermined order, and outputted to a display device.

As described above, the third embodiment is constructed in such a manner that the lead track number (i.e., frame-identifying-information) and the composing frame number (i.e., divided-part-information) are recorded in the ID code recording part of each track of the magnetic disk D. Therefore, even if consecutive blank tracks do not exist on the magnetic disk D, image signals forming one frame can be recorded on the non-consecutive blank tracks. Accordingly, the efficiency of using the magnetic disk D is improved.

Further, in the third embodiment, since it is not necessary that the image signals are recorded in the order of the composing frame number in a recording operation, all of the image signals forming one frame can be recorded on the magnetic disk D by only moving the magnetic head 11 in one direction, i.e., from outside to inside, or from inside to outside of the magnetic disk D. Furthermore, since the image signals are stored in predetermined areas of the memories 51 through 53 according to the composing frame numbers, and read out from the memories 51 through 53 in order of the composing frame numbers, it is not necessary that the image signals are reproduced from the magnetic disk D in order of the composing frame number, and thus, the tracking operation of the magnetic head 11 is simple and similar to the recording operation described above.

Figure 23:
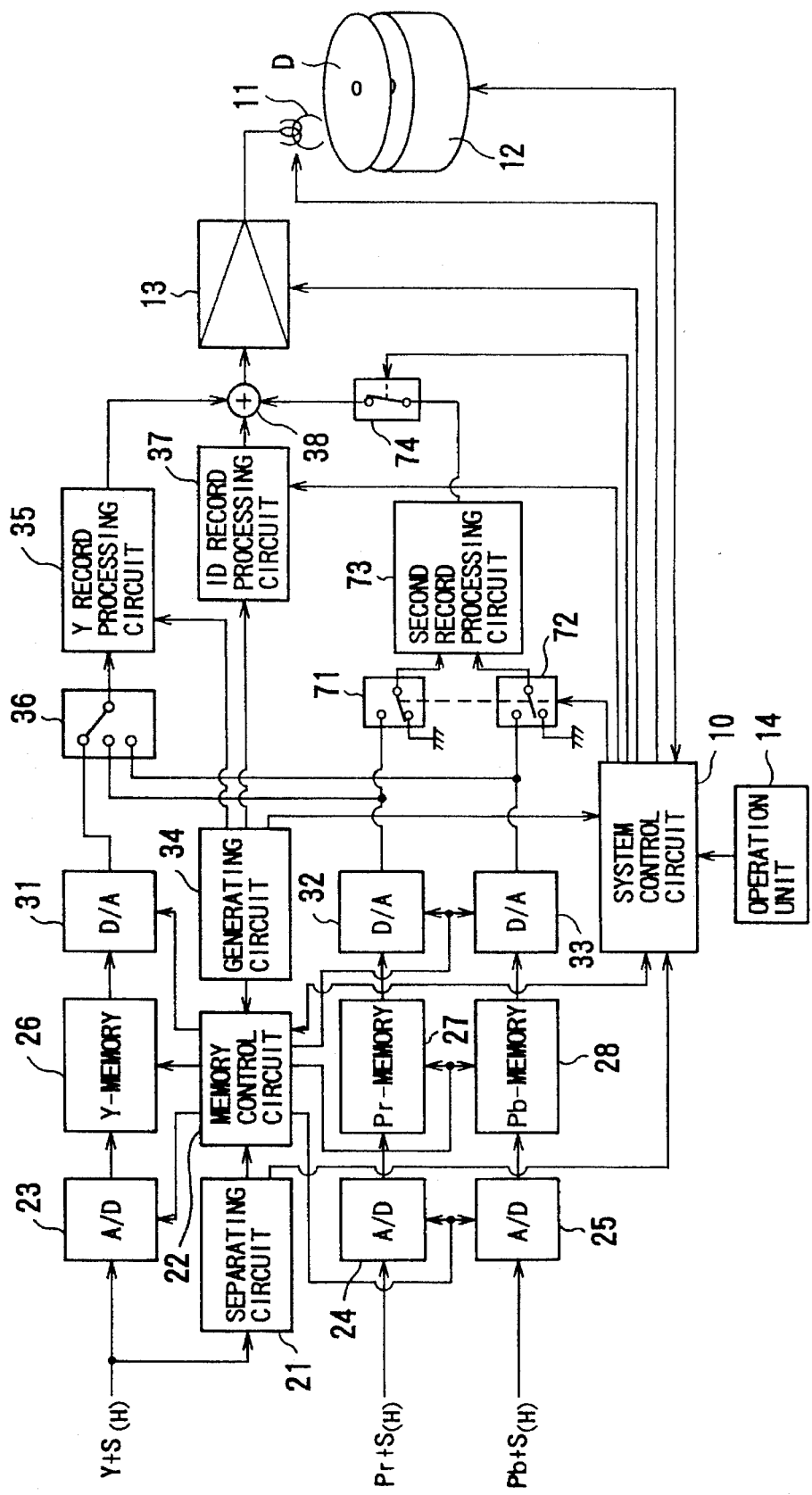
FIG. 23 is a block diagram showing a recording system of a still video device to which a fourth embodiment is applied.

FIG. 23 is a block diagram showing a recording system of a still video device to which a fourth embodiment is applied.

The construction of the recording system is basically the same as the first embodiment shown in FIG. 1, and therefore, only the components different from those of FIG. 1 are described below.

In a normal record mode described later, a D/A converted Y signal is inputted to a first record processing circuit 35 through a switch 36, and D/A converted Pr and Pb signals are inputted to a second record processing circuit 73 through switches 71 and 72, respectively. Except in the normal record mode, the D/A converted Y signal, Pr signal and Pb signal are inputted to the first record processing circuit 35 through the switch 36. The switches 71 and 72 are controlled by the system control circuit 10 to connect the second record processing circuit 73 to the D/A converters 32 and 33 in the normal record mode, and disconnect the second record processing circuit 73 from the D/A converters 32 and 33 in any other record mode.

Signals inputted to the first and second record processing circuits 35 and 73 are subjected to a process such as frequency-modulation. A synchronizing signal is inputted from a synchronizing signal generating circuit 34 to the first record processing circuit 35, and added to the Y signal, Pr signal and Pb signal in all modes except the normal record mode, and to the Y signal in the normal record mode.

An ID code inputted through the operating unit 14 and the system control circuit 10 is subjected to a process such as a differential phase shift keying (DPSK) modulation, by an ID record processing circuit 37.

The DPSK-modulated ID code and the FM-modulated Y signal, Pr signal and Pb signal are superimposed by an adder 38, and then amplified by a record amplifier 13 and transmitted to a magnetic head 11. In the normal record mode, the ID code inputted from the ID record processing circuit 37, the Y signal inputted from the first record processing circuit 35, and the Pr signal and the Pb signal inputted from the second record processing circuit 73 are superimposed in the adder 38. In any mode but the normal record mode, the ID code inputted from the ID record processing circuit 37, the Y signal, the Pr signal and the Pb signal inputted from the first record processing circuit 35, are superimposed on each other in the adder 38. A switch 74 is provided between the second record processing circuit 73 and the adder 38, and controlled by the system control circuit 10 to close in the normal record mode, and to open in any mode but the normal record mode.

The other components are the same as those shown in FIG. 1.

Figure 24:
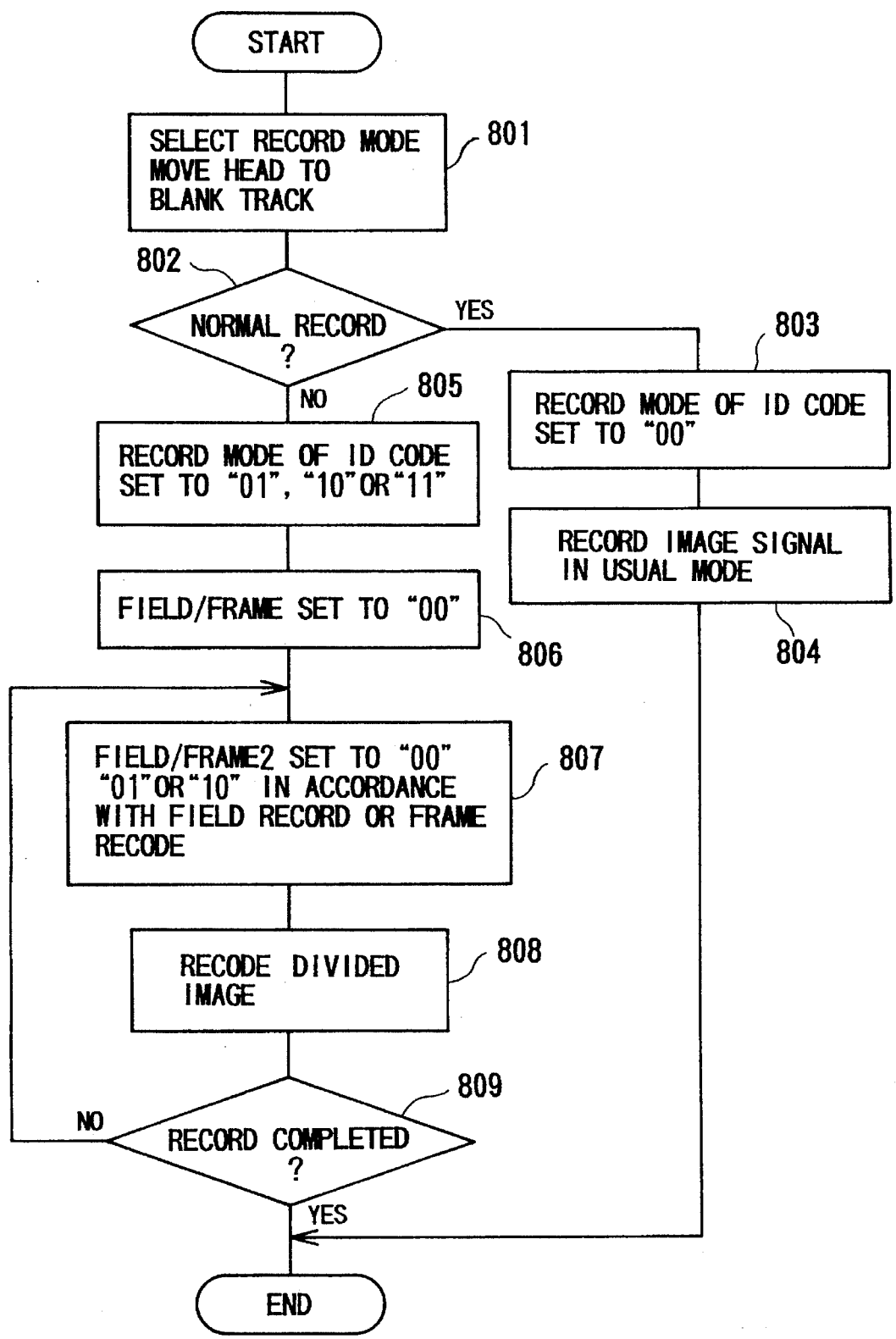
FIG. 24 is a flow chart of a program of the fourth embodiment by which image signals are recorded on a magnetic disk.

FIG. 24 shows a flow chart of a program of the fourth embodiment by which image signals are recorded on the magnetic disk D.

In Step 801, the normal record mode is selected by operating the operation unit 14, so that a signal indicating the record mode is inputted to the system control circuit 10. Further, based on the amount of an envelope signal obtained from the envelope detection circuit 43, a blank track is detected, and the magnetic head 11 is moved to this blank track.

In Step 802, it is determined whether the record mode is the normal record mode. When the mode is the normal record mode, the "RECORD MODE" bits in the ID code are set to "00" in Step 803, and then image signals are recorded on the magnetic disk D in the normal record mode, i.e., a usual mode, and this program is ended.

When it is determined in Step 802 that the record mode is not the normal record mode, Step 805 and the following steps are executed. In Step 805, the "RECORD MODE" bits in the ID code are set to "01" when the mode is the normal-signal/high-definition record mode, set to "10" when the mode is the high-definition-signal record mode, and set to "11" when the mode is the normal-signal/separating-track/frame-record mode, respectively. Then, in Step 806, "00", indicating the field record mode, is stored in "FIELD/ FRAME" recording area. In other words, when image signals corresponding to one frame are divided into a plurarity of parts and recorded on a plurality of tracks in the normal-signal/high-definition record mode, the high-definition record mode and the normal-signal/separating-track/ frame-record mode, field record mode information is stored in the "FIELD/FRAME" recording area. Note, this "FIELD/ FRAME" recording area is not provided in the user area of the ID code, but in a standard area defined by the record format of the still video as described with reference to FIG. 7.

In Step 807, the "FIELD/FRAME2" (FIG. 11) bits are set to "00", "01" or "10" in accordance with the "RECORD MODE" bits in the ID code. Namely, in the high-definition-signal record mode, when the image signals are recorded in the field record mode, the bits "00" are stored in the ID code on a track. When the image signals are recorded in the frame record mode, the bits "01" are stored in the ID code on a track for a first field, and the bits "10" are stored in the ID code on a track for a second field. On the other hand, in the normal-signal/high-definition record mode and the normal-signal/separating-track/frame-record mode, the bits "01" are stored in the ID code on a track for a first field, and the bits "10" are stored in the ID code on a track for a second field.

In Step 808, the divided image signals are recorded on tracks on the magnetic disk. In this recording operation, in addition to the image signals, "TRACKING DIRECTION" information (FIG. 12), "HEAD TRACK NUMBER" information (FIG. 13), "NEXT TRACK NUMBER" information (FIG. 14) and "COMPOSING FRAME NUMBER" information (FIG. 15) are stored in the user area of the ID code. Note, the tracking direction is predetermined by the photographer, and the lead track number is set in Step 801. The next track number is the number of a track which is positioned inwardly by one track relative to a track on which the recording operation is now being carried out. The composing frame number is set in accordance with the record mode and image signals to be recorded, as described above with reference to FIG. 15.

In Step 809, it is determined whether all of the image signals corresponding to one frame have been recorded on the magnetic disk D. This determination is carried out based on information such as the record mode. In the normal-signal/high-definition record mode, for example, since the number of the composing frames is 16 (see FIG. 2), when a recording operation for 16 tracks has been completed, it is determined that the recording operation for all of the image signals has been completed. When the recording operation for all of the image signals has not been completed, Steps 807, 808 and 809 are executed again.

Figure 25:
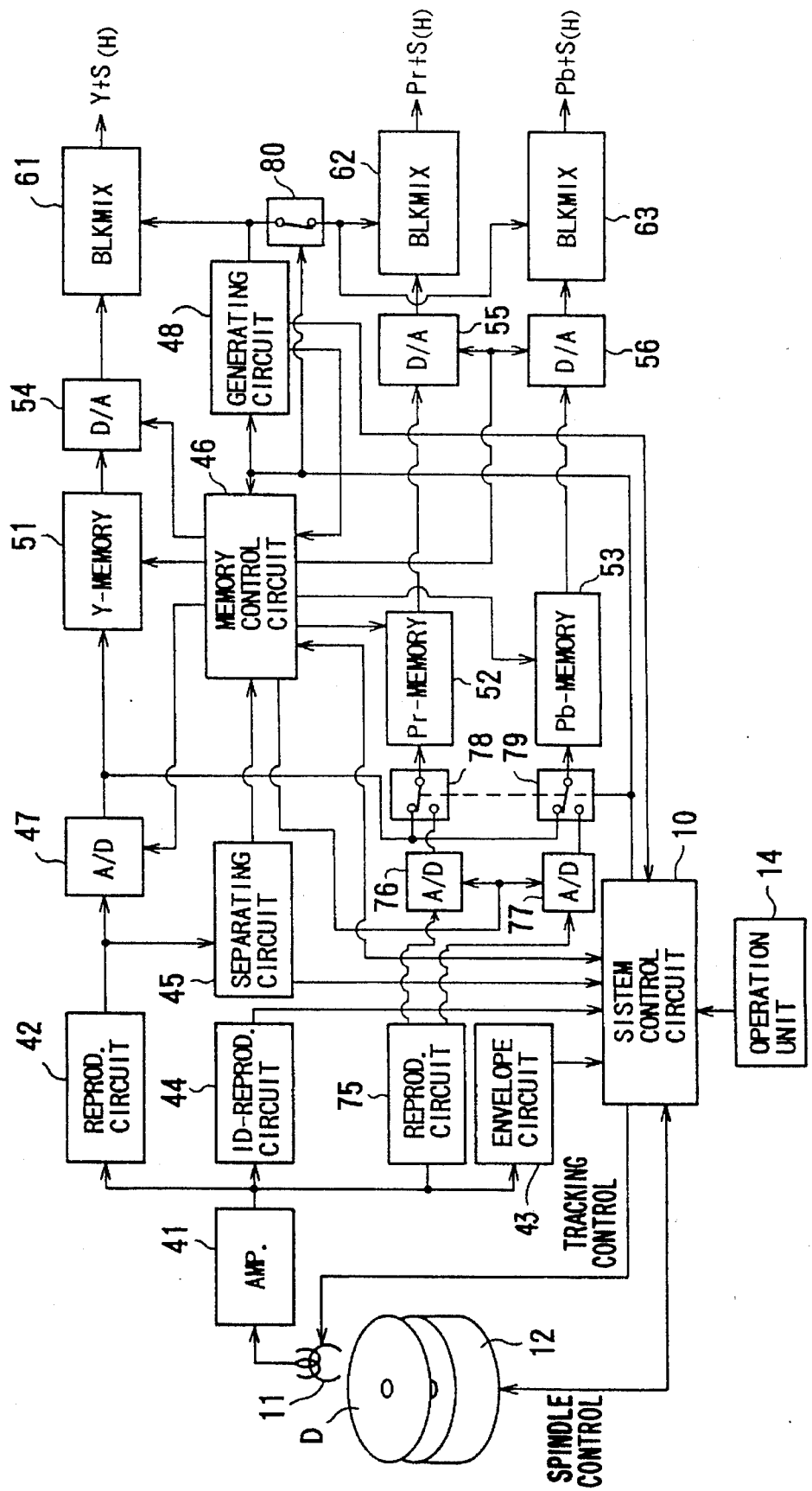
FIG. 25 is a block diagram showing a reproducing system of the still video device to which the fourth embodiment is applied.

FIG. 25 is a block diagram showing a reproducing system of the still video device to which the fourth embodiment is applied.

The construction of the reproducing system is basically the same as the first embodiment shown in FIG. 16, and therefore, only the components different from those of FIG. 16 are described below.

Except when the track has been recorded in the normal record mode, a first reproduction process circuit 42 frequency-demodulates and outputs a Y signal including synchronizing signals, a Pr signal and a Pb signal. Conversely, when the track has been recorded in the normal record mode, the first reproduction process circuit 42 frequency-demodulates and outputs a Y signal including synchronizing signals, and a second reproduction process circuit 75 frequency-demodulates and outputs a Pr signal and a Pb signal. The frequency-demodulated Y signal, Pr signal and Pb signal are A/D converted by A/D converters 47, 76 and 77. The A/D converter 47 is connected to a Y-memory 51, and the A/D converters 76 and 77 are connected to a Pr-memory 52 or a Pb-memory 53 through a switch 78 or 79. The switches 78 and 79 are switched under the control of the system control circuit 10 to connect the Pr-memory 52 and the Pb-memory 53 to the A/D converter 47, except in the normal record modes and to connect the Pr-memory 52 and the Pb-memory 53 to the A/D converters 76 and 77 in the normal record mode.

An envelope detection circuit 43 senses the envelope signals of the Y signal, the Pr signal and the Pb signal, so that it is determined whether the reproduced track is a blank track. An ID-reproduction process circuit 44 DPSK-demodulates and outputs the ID code.

A synchronizing signal S included in the Y signal is separated from the Y signal by a synchronizing signal separating circuit 45, and passed to a memory control circuit 46 and the system control circuit 10. The memory control circuit 46 controls the A/D converters 47, 76, 77, the Y-memory 51, the Pr-memory 52 and the Pb-memory 53, based on the synchronizing signal S. Furthers the memory control circuit 46 controls the D/A converters 54, 55, 56, the Y-memory 51, the Pr-memory 52 and the Pb-memory 53, based on a synchronizing signal outputted from a synchronizing signal generating circuit Except when the track has been recorded in the normal record mode, the Y signal including the synchronizing signal is outputted from the first reproduction process circuit 42, and A/D converted by the A/D converter 47. Then, the Y signal recorded between two synchronizing signals is stored in the Y-memory 51 under the control of the memory control circuit 46. The Y signal stored in the Y-memory 51 is D/A converted by the D/A converter 54, based on a synchronizing signal (a standard clock signal) outputted from the synchronizing signal generating circuit 48. Similarly, the Pr and Pb signals are outputted from the first reproduction process circuit 42, A/D converted by the A/D converter 47, and stored in the Pr-memory 52 and the Pb-memory 53, respectively. The Pr and Pb signals are outputted from the Pr-memory 52 and the Pb-memory 53, based on the standard clock signal, and inputted to the D/A converters 55 and 56 to be D/A converted under the control of the memory control circuit 46.

Conversely, when the track has been recorded in the normal record mode, the Y signal outputted from the first reproduction process circuit 42 and including the synchronizing signal is A/D converted by the A/D converter 47, and the Y signal between two synchronizing signals is stored in the Y-memory 51 under the control of the memory control circuit 46. The Y signal stored in the Y-memory 51 is D/A converted by the D/A converter 54, based on a synchronizing signal (a standard clock signal) outputted from the synchronizing signal generating circuit 48. On the other hand, the Pr and Pb signals are outputted from the second reproduction process circuit 75, and A/D converted by the A/D converters 76 and 77, respectively. Then, the Pr and Pb signals are stored in the Pr-memory 52 and the Pb-memory 53 through the switches 7B and 79, respectively. The Pr and Pb signals are outputted from the Pr-memory 52 and the Pb-memory 53, based on the standard clock signal, and inputted to the D/A converters 55 and 56 to be D/A converted under the control of the memory control circuit 46. Note, the synchronizing signal generating circuit 48 is controlled by the system control circuit 10, to change the synchronizing signal outputted therefrom in accordance with whether the record mode is the normal record mode.

A switch 80 is provided between the synchronizing signal generating circuit 48 and the blanking sync mix circuits 61 and 62, and is closed by the system control circuit 10 except in the normal record mode, when it is opened. Namely, in the normal record mode, the synchronizing signal is not added to the Pr signal or the Pb signal.

The other components are the same as those shown in FIG. 16.

Figure 26:
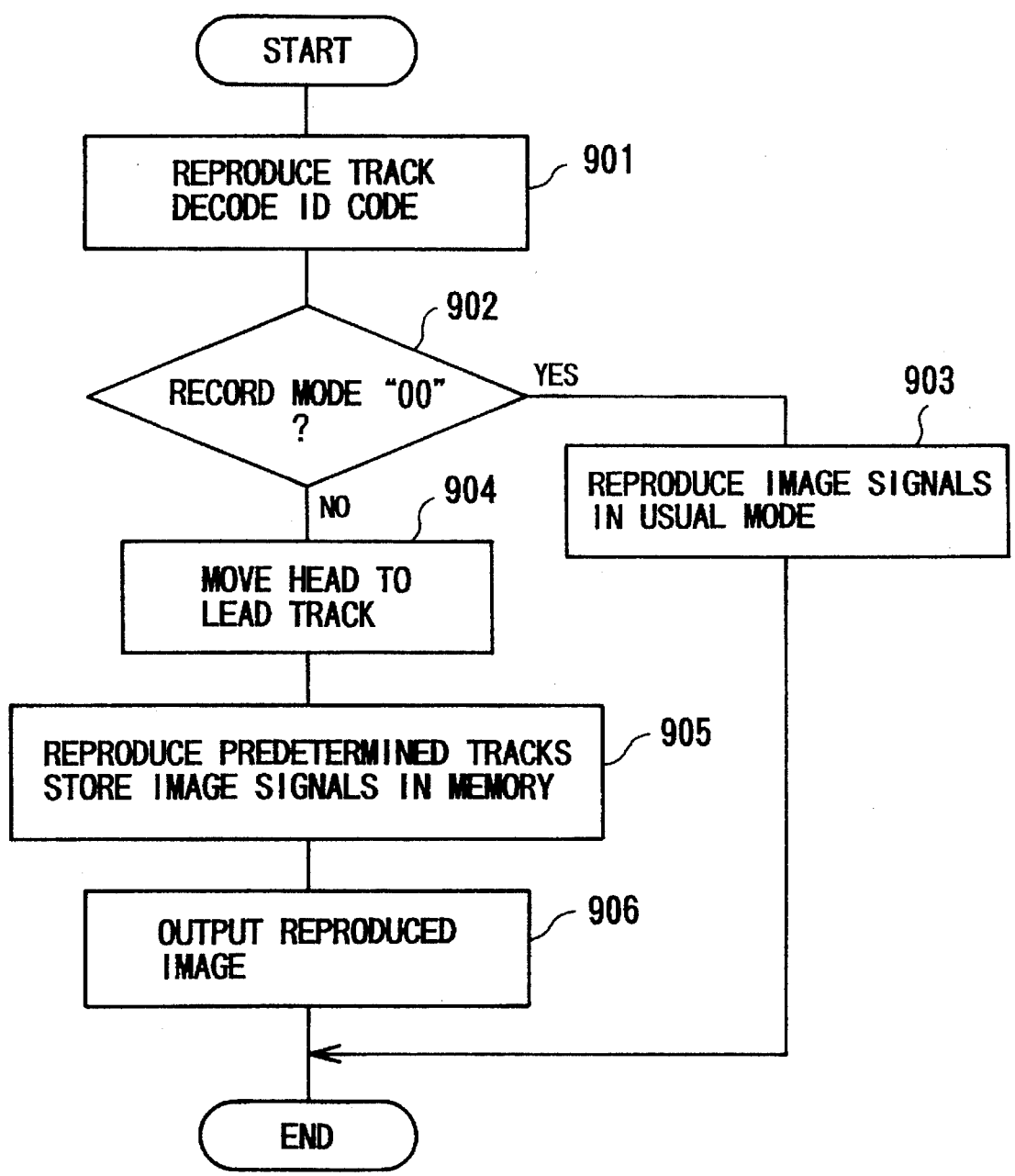
FIG. 26 is a flow chart of a program of the fourth embodiment by which image signals recorded on the magnetic disk are reproduced.

FIG. 26 shows a flow chart of a program of the fourth embodiment by which image signals recorded on the magnetic disk D are reproduced.

In Step 901, the track at which the magnetic head 11 is positioned at that time is reproduced and the ID code recorded on the track is decoded. Namely, the information such as the record mode, the field/frame2, the tracking direction, the lead track number, the next track number and the composing frame number is decoded. In Step 902, it is determined whether the record mode bits are set to "00". When the record mode bits are set to "00", the image signals are reproduced in the usual mode in Step 903, and this program is ended. Conversely, when the record mode bits are not set to "00" the process goes to Step 904 so that the image signals are divided into a plurality of parts and reproduced.

In Step 904, the magnetic head 11 is moved to the lead track in accordance with the absolute track number of the track on which the lead composing frame is recorded, among the tracks on which the image signals forming the same frame as the image signal recorded on the track under the head are recorded. Then, in Step 905, the magnetic head 11 is moved so that a predetermined track on which the image signal is recorded in conformity with the record mode is reproduced and the image signals are stored in predetermined areas of the memories 51 through 53. In Step 906, the image signals stored in the memories 51 through 53 are read out, and outputted to a display device.

Accordingly, according to the fourth embodiment, even if a track on which an image signal is recorded in the high-definition-signal record mode as shown in FIG. 2 and a track on which an image signal is recorded in the normal-signal/normal-record mode (the normal record) are mixed on one magnetic disk D, the reproducing operation is properly carried out by detecting the record mode in the ID code.

Further, information indicating the field record mode is stored in the "FIELD/FRAME" recording area of the ID code of a track on which an image signal is recorded in the high-definition-signal record mode. Therefore, if a magnetic disk D, on which tracks in the high-definition-signal record mode and tracks in the normal record mode are mixed, is reproduced by a conventional still video device, i.e., a still video device which is not constructed in such a manner that a divided frame can be reproduced, regarding tracks recorded in the high-definition-signal record mode, only one track is reproduced. Therefore, only a left upper quarter, for example, is reproduced, and the image is displayed in black and white. Regarding a track recorded in the normal record mode, one frame is reproduced. Namely, in case of a track recorded in the high-definition-signal record mode, a frame without a flicker is displayed on the display device, so that the contents of the frame recorded on the track can be discriminated.

Note, although each of the above embodiments is constructed in such a manner that image signals and the other signals are recorded on the magnetic disk D, the recording medium is not restricted to the magnetic disk.

Further, the present invention is not restricted to a construction by which one frame is divided into a plurality of parts to be recorded in the recording medium, but can be applied to a construction in which image signals corresponding to one frame are recorded on a plurality of tracks without dividing the one frame.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. 4-290746, 4-290747 4-290748 and 4-290749 (all filed on Oct. 5, 1992) which are expressly incorporated herein by reference in their entirety.

I claim:

1. A still image recording device, comprising:

a recording medium having a plurality of recording areas wherein each recording area of said plurality of recording areas comprises an image signal recording part and an ID code recording part, respectively, an image signal being recorded in said image signal recording part, an ID code, including a date, being recorded in said ID code recording part, a standard area of said ID code recording part comprising a field-frame-information recording area in which information indicating whether the image signal recorded in said image signal recording part is recorded in a field record mode or a frame record mode and a user area of said ID code recording part comprising a frame dividing information storage area in which information indicating whether an image signal corresponding to one frame is recorded in a plurality of said plurality of recording areas;

means for dividing an image signal corresponding to one frame into a plurality of parts;

means for selecting a blank recording area from said plurality of recording areas, in which no signal is recorded;

means for recording said plurality of parts of said image signal in said image signal recording part of said blank recording area; and means for recording frame-identifying-information in said ID code recording part of each said recording area in which said image signal, represented by said plurality of parts, is recorded by said means for recording said plurality of parts, said plurality of parts of said image signal corresponding to said one frame, recorded by said means for recording said plurality of parts being identified by said frame-identifying-information, wherein said frame-identifying-information comprises field-frame-information indicating the field record mode whenever said information in said frame dividing information storage area indicates that an image signal corresponding to one frame is divided into fields and at least one of said fields is further divided and recorded in a plurality of recording areas of said recording medium.

2. A still image recording device according to claim 1, wherein said recording medium comprises a magnetic disk, and said recording area comprises a track formed on said magnetic disk.

3. A still image recording device according to claim 1, wherein said selecting means determines whether all of said recording areas of said recording medium have been recorded, prior to a recording operation of said divided plurality of parts recording means.

4. A still image recording device according to claim 1, wherein said selecting means determines whether a predetermined recording area of said recording medium has not been recorded, and if said predetermined recording area has been recorded, said selecting means determines whether a recording area adjacent to said predetermined recording area has not been recorded.

5. A still image recording device according to claim 1, wherein said frame-identifying-information comprises a recording area number of said recording area which should be reproduced first in a reproducing operation.

6. A still image recording device according to claim 1, further comprising means for recording a recording area number of a second recording area in an ID code recording part of a first recording area, an image signal recorded in said first recording area being reproduced, and then an image signal recorded in said second recording area being reproduced.

7. A still image recording device according to claim 1, further comprising means for recording a composing frame number in said ID code recording part of said each recording area, said composing frame number indicating a relationship between said divided plurality of parts of said image signal recorded in said each recording area and a frame composed by said divided plurality of parts of said image signal.

8. A still video device in which a recording medium is mounted, said recording medium having a plurality of recording areas in each of which an image signal recording part and an ID code recording part are provided, an image signal being recorded in said image signal recording part, an ID code, including a date, being recorded in said ID code recording part, said device comprising:

means for dividing an image signal corresponding to one frame into a plurality of parts;

means for recording said divided parts of said image signal in said recording areas;

means for recording field-frame-information in a standard area of said ID code recording part of each of said recording areas to indicate whether the image signal recorded in said image signal recording part is recorded in a field record mode or a frame record mode;

means for recording frame-identifying-information including frame dividing information in a user area of said ID code recording part of each of said recording areas, a frame corresponding to said divided parts of said image signal being identified by said frame dividing information;

means for recording divided-parts-information in said ID code recording part, said divided-parts-information being specific to each of said divided parts; and means for reproducing said image signal corresponding to one frame, in accordance with said frame-identifying-information and said divided-parts-information;

wherein said field-frame-information recording means records information indicating the field record mode whenever said frame dividing information recording means records information indicating that an image signal corresponding to one frame is divided into fields and at least one of said fields is further divided and recorded in a plurality of recording areas of said recording medium.

9. A still video device according to claim 8, wherein said recording medium is a magnetic disk, and said recording area is a track formed on said magnetic disk.

10. A still video device according to claim 8, wherein said divided parts recording means comprises:

a first memory in which said divided parts of said image signal are stored; and means for reading said divided parts of said image signal from said first memory, and recording said divided parts of said image signal to said recording areas with time-expanding.

11. A still video device according to claim 8, wherein said frame-identifying-information is recorded in all of said recording areas in which said divided parts of said image signal composing a specific frame are recorded.

12. A still video device according to claim 8, wherein said frame-identifying-information further comprises a recording area number of a recording area which should be reproduced first in a reproducing operation.

13. A still video device according to claim 12, further comprising means for positioning a reproduction head on said recording area which should be reproduced first in said reproducing operation.

14. A still video device according to claim 8, wherein said divided-parts-information comprises a recording area number of a recording area which should be reproduced subsequent to the reproduction of a recording area in which said divided-parts-information is recorded.

15. A still video device according to claim 8, wherein said divided-parts-information comprises a composing frame number indicating a relationship between said divided parts of said image signal recorded in said recording area and the frame composed of said divided parts of said image signal.

16. A still video device according to claim 8, wherein said reproducing means comprises:

a second memory in which said divided parts of said image signal read from said recording medium are stored, in accordance with said frame-identifying-information and said divided-parts-information; and means for reading said divided parts of said image signal from said second memory, in a predetermined sequence.

17. A still video device in which a recording medium is mounted, the recording medium having a plurality of recording areas wherein each recording area of said plurality of recording areas comprises an image signal recording part and an ID code recording part, an image signal being recorded in said image signal recording part and an ID code, including a date, being recorded in said ID code recording part, a standard area of said ID code recording part comprising a field-frame-information recording area in which information indicating whether the image signal recorded in said image signal recording part is recorded in a field record mode or a frame record mode and a user area of said ID code recording part comprising a frame dividing information storage area in which information indicating whether an image signal corresponding to one frame is recorded in a plurality of said plurality of recording areas, wherein said information recorded in said field-frame-information recording area indicates the field record mode whenever said information recorded in said frame dividing information storage area indicates that an image signal corresponding to one frame is divided into fields and at least one of said fields is further divided and recorded in a plurality of recording areas of said recording medium; said device comprising:

means for dividing an image signal corresponding to one frame into a plurality of parts, and storing said divided parts of said image signal in a memory;

means for recording said divided parts of said image signal in said image signal recording part with time-expanding, and recording reproducing information in said ID code recording part, said reproducing information being necessary in a reading operation of said image signal; and means for positioning a reproduction head on a recording area which should be reproduced first in a reproducing operation of said image signal.

18. A still video device according to claim 17, wherein said recording means records tracking-direction information indicating a moving direction in which said reproduction head is moved.

19. A still video device according to claim 18, wherein said tracking-direction information indicates whether said reproduction head is moved from the outside to the inside of the recording medium, or from the inside to the outside of the recording medium.

20. A still video device in which a recording medium is mounted, the recording medium having a plurality of recording areas wherein each recording area of said plurality of recording areas comprises an image signal recording part and an ID code recording part, an image signal being recorded in said image signal recording part, an ID code, including a date, being recorded in said ID code recording part, a standard area of said ID code recording part comprising a field-frame-information recording area in which information indicating whether the image signal recorded in said image signal recording part is recorded in a field record mode or a frame record mode and a user area of said ID code recording part comprising a frame dividing information storage area in which information indicating whether an image signal corresponding to one frame is recorded in a plurality of said plurality of recording areas, wherein said information recorded in said field-frame-information recording area indicates the field record mode whenever said information recorded in said frame dividing information storage area indicates that an image signal corresponding to one frame is divided into fields and at least one of said fields is further divided and recorded in a plurality of recording areas of said recording medium; said device comprising:

means for recording a lead-area-number in said ID code recording part of each of said recording areas, said lead-area-number indicating the recording area number of a recording area which should be reproduced first in a reproducing operation;

means for recording a next-area-number in said ID code recording part, said next-area-number indicating a recording area number of a recording area which should be reproduced subsequent to a reproduction of a recording area in which said next-area-number is recorded; and means for reproducing said image signal corresponding to one frame, said reproducing means first reproducing a recording area having said lead-area-number, and then a predetermined recording area, in accordance with said next-area-number.

21. A still video device in which a recording medium is mounted, the recording medium having a plurality of recording areas wherein each recording area of said plurality of recording areas comprises an image signal recording part and an ID code recording part, an image signal being recorded in said image signal recording part, an ID code, including a date, being recorded in said ID code recording part, a standard area of said ID code recording part comprising a field-frame-information recording area in which information indicating whether the image signal recorded in said image signal recording part is recorded in a field record mode or a frame record mode and a user area of said ID code recording part comprising a frame dividing information storage area in which information indicating whether an image signal corresponding to one frame is recorded in a plurality of said plurality of recording areas, said device comprising:

means for recording field-frame-information in said standard area of said ID code recording part of each of said recording areas to indicate whether the image signal recorded in said image signal recording part is recorded in a field record mode or a frame record mode;

means for recording frame dividing information in said user area of said ID code recording part of each of said recording areas, a frame corresponding to said divided parts of said image signal being identified by said frame dividing information;

means for recording a composing frame number in said ID code recording part, said composing frame number indicating the relationship between said image signal recorded in said recording area and the frame composed by said image signal;

means for storing said image signal in a predetermined area of a memory, in accordance with said frame dividing information and said composing frame number; and means for reading said image signal stored in said memory, in a predetermined order, to reproduce one frame image;

wherein said field-frame-information recording means records information indicating the field record mode whenever said frame dividing information recording means records information indicating that an image signal corresponding to one frame is divided into fields and at least one of said fields is further divided and recorded in a plurality of recording areas of said recording medium.

* * * * *

UNITED STATES PATENT AND TRADEMARK OFFICE
CERTIFICATE OF CORRECTION

PATENT NO. : 5,526,138
DATED : June 11, 1996
INVENTOR(S) : K. SATO

It is certified that error appears in the above-indentified patent and that said Letters Patent is hereby corrected as shown below:

On the title page, item... [73], "Assignee", line 1, after "Kogaku" insert ---Kogyo---.

On the title page, item ... [73], "Assignee", line 1, after "Kaisha" insert ---Tokyo,---.

Signed and Sealed this

First Day of October, 1996

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,526,138
DATED : June 11, 1996
INVENTOR(S) : K. SATO

It is certified that error appears in the above-indentified patent and that said Letters Patent is hereby corrected as shown below:

On the title page, item [30],
"Foreign Application Priority Data", line 5. change "October 15, 1992" to ---October 5, 1992---.

Signed and Sealed this

Twelfth Day of November, 1996

Attest:

BRUCE LEHMAN

Attesting Officer    Commissioner of Patents and Trademarks